(12) United States Patent  
Maeda et al.

(10) Patent No.: US 6,731,441 B2  
(45) Date of Patent: May 4, 2004

(54) INFORMATION RECORDING AND REPRODUCING APPARATUS

(75) Inventors: Hideaki Maeda, Hachioji (JP); Morishi Izumita, Inagi (JP); Terumi Takashi, Chigasaki (JP); Seiichi Mita, Tsukui (JP)

(73) Assignees: Hitachi, Ltd., Tokyo (JP); Toyota School Foundation, Nagoya (JP)

( * ) Notice: Subject to any disclaimer, the term of this patent is extended or adjusted under 35 U.S.C. 154(b) by 0 days.

(21) Appl. No.: 10/214,599

(22) Filed: Aug. 9, 2002

(65) Prior Publication Data

US 2003/0067696 A1 Apr. 10, 2003

(30) Foreign Application Priority Data

Oct. 10, 2001 (JP) .................................... 2001-312119

(51) Int. Cl.[7] .............................................. G11B 20/06

(52) U.S. Cl. ............................. 360/29; 360/46; 360/31

(58) Field of Search ...................... 714/41, 38; 341/324, 341/15, 38; 360/48, 65, 46, 55

(56) References Cited

U.S. PATENT DOCUMENTS 4,979,046 A * 12/1990 Aki et al. ..................... 386/26  
5,663,844 A * 9/1997 Gohda et al. ................. 360/65  
5,818,653 A * 10/1998 Park et al. .................... 360/32

OTHER PUBLICATIONS

"Digital Communications" 3rd Edition, pp. 190–301, 1995 written by J.G. Proakis.

Japanese Laid–open No. 9–289529.

Japanese Laid–open No. 6–325493.

* cited by examiner

Primary Examiner—David Hudspeth  
Assistant Examiner—Glenda P. Rodriguez  
(74) Attorney, Agent, or Firm—Antonelli, Terry, Stout & Kraus, LLP

(57) ABSTRACT

Here is disclosed an information recording and reproducing apparatus comprising a multi-phase quadrature angular modulator for subjecting a signal to be written on a recording medium to multi-phase quadrature angular modulation to generate a modulated signal expressing information in phase difference and frequency difference, a quantizer for generating a discrete signal by making discrete the amplitude of the modulated signal generated by the quadrature angular modulator with reference to a certain level, a write head for writing the output signal of the quantizer onto the recording medium, a read head for reading information written on the recording medium, a read compensate circuit for compensating the phase and amplitude of a signal readout of the read head, and a multi-phase quadrature angular demodulator for demodulating a signal supplied from the read compensate circuit by subjecting it to multi-phase quadrature angular demodulation. By expressing information to be recorded in phase difference or frequency difference, it is made possible to record or reproduce the information at the varying timing of amplitude, and the bit inversion interval can be controlled by regulating the timing of amplitude variation.

20 Claims, 17 Drawing Sheets

INFORMATION RECORDING AND REPRODUCING APPARATUS

BACKGROUND OF THE INVENTION

1. Field of the Invention

The present invention relates to an information recording and reproducing apparatus, and more particular to a signal processing method, a signal processing circuit and a signal processing apparatus and a signal modulating/demodulating method and a modulating/demodulating apparatus for use in an information recording and reproducing apparatus such as a magnetic disk apparatus.

2. Description of the Prior Art

For signal processing in a magnetic recording and reproducing apparatus such as a magnetic disk apparatus, a partial response maximum likelihood decoding (PRML) system is used. The PRML system is a combination of a partial response PR system and a maximum likelihood (ML) decoding method. The PR system is a technique which allows limitation of the band of codes by positively utilizing interference between adjoining signals. Since the PR system gives rise to correlations between signals, the ML decoding method makes possible decoding on a sequence-by-sequence basis by utilizing the correlations.

FIG. 2 shows the configuration of a magnetic disk apparatus using the conventional PRML system, and FIG. 3, a write current waveform and a reproduction waveform by the conventional PRML system.

Referring to FIG. 2, on the recording side, write data 101 are encoded into an error correcting code signal by an error correcting code generator 111. The error correcting code signal 112 is run length limited-encoded (RLL-encoded) by an error correcting code signal generator 113, and a RLL code 114 is thereby generated. A read auxiliary signal generator 12 consists of a preamble signal generator 121 and a synchronizing signal generator 123, and the preamble signal generator 121 generates a preamble signal 122 having data clock information and amplitude compensating information. The synchronizing signal generator 123 generates a synchronizing signal 124 containing read clock information. The RLL code 114, the preamble signal 122 and the synchronizing signal 124 are arranged by a signal arrangement circuit 125 into a sequence fitting a format.

A write compensation circuit 131 generates a compensated write signal 132 having undergone compensation for the component of distortion to which the signal is subjected on a recording medium, and the signal is amplified by a write amplifier 133. A write head 135, which is a magnetic head, writes information on a recording medium 103 on the basis of a write current waveform 134. The write current waveform manifested by the recording signal 134 will be described afterward with reference to FIG. 3.

Then, on the reproducing side, information written on the recording medium 103 is read by a read head 151 to obtain a read current signal 152. A read amplifier 153 amplifies the read current signal 152, and delivers it to an equalizer 163 via a read compensation circuit 161. Here, a read auxiliary circuit 165 extracts the preamble signal 122 and the synchronizing signal 124. It further extracts read clock information from the synchronizing signal 124, and extracts data clock information 167 and compensated amplitude information 167 from the preamble signal 122.

By utilizing these read auxiliary signals, the equalizer 163 supplies an equalized signal 164 whose waveform is shaped to desired partial response characteristics. This equalized signal 164 is entered into an ML decoder 171, which delivers a partial response signal 170. A RLL coder 181 acquires an RLL signal 182 from the partial response signal 170. An error correcting code decoder 183 corrects any error in the RLL signal 182 to acquire read data 102.

Next will be described the write current waveform 134 and the read current signal 152 of the PRML system with reference to FIG. 3. In a conventional recording system, such as the PRML system, information is determined by whether or not the amplitude of the write current waveform 134 is inverted according to the recording bit that is entered. When "1" is entered, the current waveform is inverted (191), or when "0" is entered, the state before its entry is maintained, and the current waveform is not inverted (192). If "1" is consecutively recorded (194), the current waveform will be inverted in every bit period, and the inverting intervals of the write current will be minimized (193). The value that this write current waveform 134 can take is either one of positive and negative levels (±1), and the amperage varies in every bit period. Therefore, information that can be recorded per bit period is one bit.

For read signals on the other hand, the minimum inverting interval of magnetization becomes shorter with an increase in density and, where the adjacent magnetization is inverted (194), the read signal is much weakened by interference (195). Moreover, the higher the density, the greater the impacts of medium noise and thermal demagnetization, giving rise to a problem that magnetization is lost and errors increase.

Signal processing techniques applicable to such a magnetic disk apparatus include improved versions of the PRML system, such as the extended PRML (EPRML) system and the expanded EPRML (EEPRML) system. These system effectively utilize the energy of signals, weakened by interference, by expanding the energy per bit over the time of delay during which the interference occurs.

Other techniques for expressing signals at multiple levels and recording/reproducing them include a multi-level modulation recording system using an orthogonal modulation technique. There is a system by which information is divided into in-phase and quadrature components and modulated, and combining the so-modulated components makes possible recording of multiple levels. This technique is disclosed in the Japanese Patent Laid-open No. 6-325493. According to this patent application, write information is divided into two signal sequences, of which one is not encoded and the other is convolutionally encoded. Each signal sequence is entered into a circuit known as a signal mapper, and the signals are arranged at quadrature points so arranged on a circle as to maximize the distances between the signals. After the arrangement of signal points, a carrier frequency referencing a system clock is modulated with sine components and cosine components. According to this technique, the resultant modulated waveforms are quantized at a plurality of levels, and signal waveforms having undergone digital-to-analog (D/A) conversion are recorded.

On the other hand, as one of multi-phase quadrature angular modulation systems, there is the continuous phase modulation (CPM) system disclosed in a book by J. G. Proakis and elsewhere.

By the CPM system, information is expressed in phase difference and frequency difference. The modulation waveform of this CPM system, unlike those of usual modulation systems, becomes continuous in symbol periods, has no steep variations. Accordingly, it allows narrowing of the frequency band of the modulation waveform. Therefore, it is known as a modulation system for communication apparatuses including those for wireless communication with a view to enhancing the efficiency of frequency utilization. The prior art in this category includes techniques for enhancing the efficiency of frequency utilization or use for modulation in communications as discussed in J. G. Proakis, *Digital Communications*, 3rd edition, pp.190–301, 1995 (first published in 1989). More recently, a combination of differential detecting and Viterbi decoding is disclosed in the Japanese Patent Laid-open No. 9-289529 and elsewhere regarding a technique for use in communication apparatuses as a CPM demodulating method in satellite communication and other situations where sufficient accuracy is not ensured.

Modulation and demodulation in a communications apparatus use a carrier wave. A communications apparatus may use as its carrier either the cosine wave ($\cos(2\pi f_c t)$ where $f_c$ is the carrier frequency and t, the time) of the in-phase component expressed as a real value or $\exp(j2\pi f_c t)$ (j expresses an imaginary unit) indicated by Euler's theorem expressed as an imaginary company besides the in-phase component. Where a carrier of $\exp(j2\pi f_c t)$ is used, a satisfactory S/N ratio can be obtained, unaffected by harmonic components.

According to the conventional recording technique, since signals are expressed in terms of the presence or absence of bit inversion in every bit period, the minimum interval of the inversion of magnetization is determined by the bit period. Therefore, with an increase in recording density, the bit period shortens and so does the minimum interval of the inversion of magnetization. This shortening of the minimum interval of the inversion of magnetization invites a deterioration in S/N ratio.

In spite of this problem, higher-order PRML systems such as EPRML and EEPRML are nothing to improve the minimum interval of the inversion of magnetization. On the other hand, according to the technique disclosed in the Japanese Patent Laid-open No. 6-325493, the amplitude inversion of the recording current at a frequency of an integral multiple of the bit period because the convolutional encoder and the carrier frequency reference a system clock. Or in an apparatus in which the amplitude is made discrete and the amplitude level that can be taken is fixed, the level of quantization is limited. These techniques cannot enhance the density of recording in an apparatus that can take only two levels (±1) of amplitude, such as a magnetic disk apparatus, and the interval of the inversion of magnetization cannot be extended.

Recording of two kinds of signals, in-phase and quadrature, would reduce the density of recording, and therefore is not applied to recording apparatuses. Moreover, as no consideration is given to solving the problem of a reduced recording density, there are no signal processing functions unique to recording apparatuses, such as controls on the discreteness of amplitude and the bit inversion interval, there is no precedent of applying the CPM system to a recording apparatus. Nor is there any case of improving the recording frequency band by the CPM system.

SUMMARY OF THE INVENTION

An object of the present invention is to provide a signal processing method for enabling an information recording and reproducing apparatus, in which the amplitude signals can take is limited, to apply signals of multiple levels beyond this amplitude to recording and reproduction.

Another object of the invention is to provide a signal processing method for enabling, where information is to be expressed in phase difference or frequency difference, the bit inversion interval of recorded signals to be controlled by regulating the timing of amplitude variation.

According to the invention, in an information recording and reproducing apparatus which makes the amplitude of signals discrete and whose recorded/reproduced signals have a fixed amplitude and a fixed level, data are expressed at the time at which signals vary, and the interval of signal inversion is controlled to a certain fixed length. For this reason, a phase/frequency modulation/demodulation system, which provides a continuous modulated waveform, to make the amplitude of the modulated wave discrete.

Where it is to be applied to a magnetic disk apparatus, as a magnetic disk apparatus can take two levels of amplitude, the amplitude has to be made discrete. For correct demodulation of signals resulting from making the amplitude discrete, a modulation system which would keep the envelope constant is used. As one of such modulation systems, the CPM system known as a narrow band modulation system, whose envelope is constant, is used. Since the CPM system performs narrow band modulation, the interval of signal inversion can be limited within a certain range. Furthermore, because information is expressed in the phase and frequency components of signals, even where the amplitude is made discrete and signals recorded/reproduced have a certain fixed amplitude level, signals that can be distinguished at multiple levels can be recorded and reproduced.

The invention also achieves a signal processing method for use by an information recording and reproducing apparatus which, in demodulating signals to be reproduced by using a demodulation system requiring frequency characteristics similar to the characteristics of the transmission channel, varies the power ratio between the upper side band and the lower side band according to the recording density thereby to suppress noise in the upper side band when accomplishing demodulation.

For this purpose, there is configured a demodulating system taking account of power distribution between the upper side band and the lower side band in which signals to be recorded and reproduced are deformed by the characteristics of the transmission channel of the recording/reproducing system. More preferably, a vestigial side band (VSB) demodulating system should be used. Whereas the characteristics of the transmission channel given by the recording/reproducing system of a magnetic disk apparatus, for instance, significantly attenuate the upper side band, the use of a VSB demodulating system according to the invention makes it possible to suppress noise in the upper side band and improve performance without having to increase the circuit dimensions by utilizing the characteristics of the transmission channel that the upper side band is significantly attenuated and introducing a means of equalization to the VSB demodulation characteristics.

DETAILED DESCRIPTION OF PREFERRED EMBODIMENTS

Information recording and reproducing apparatuses embodying the present invention, wherein the invention is applied to magnetic disk apparatuses will be described below.

Figure 1:
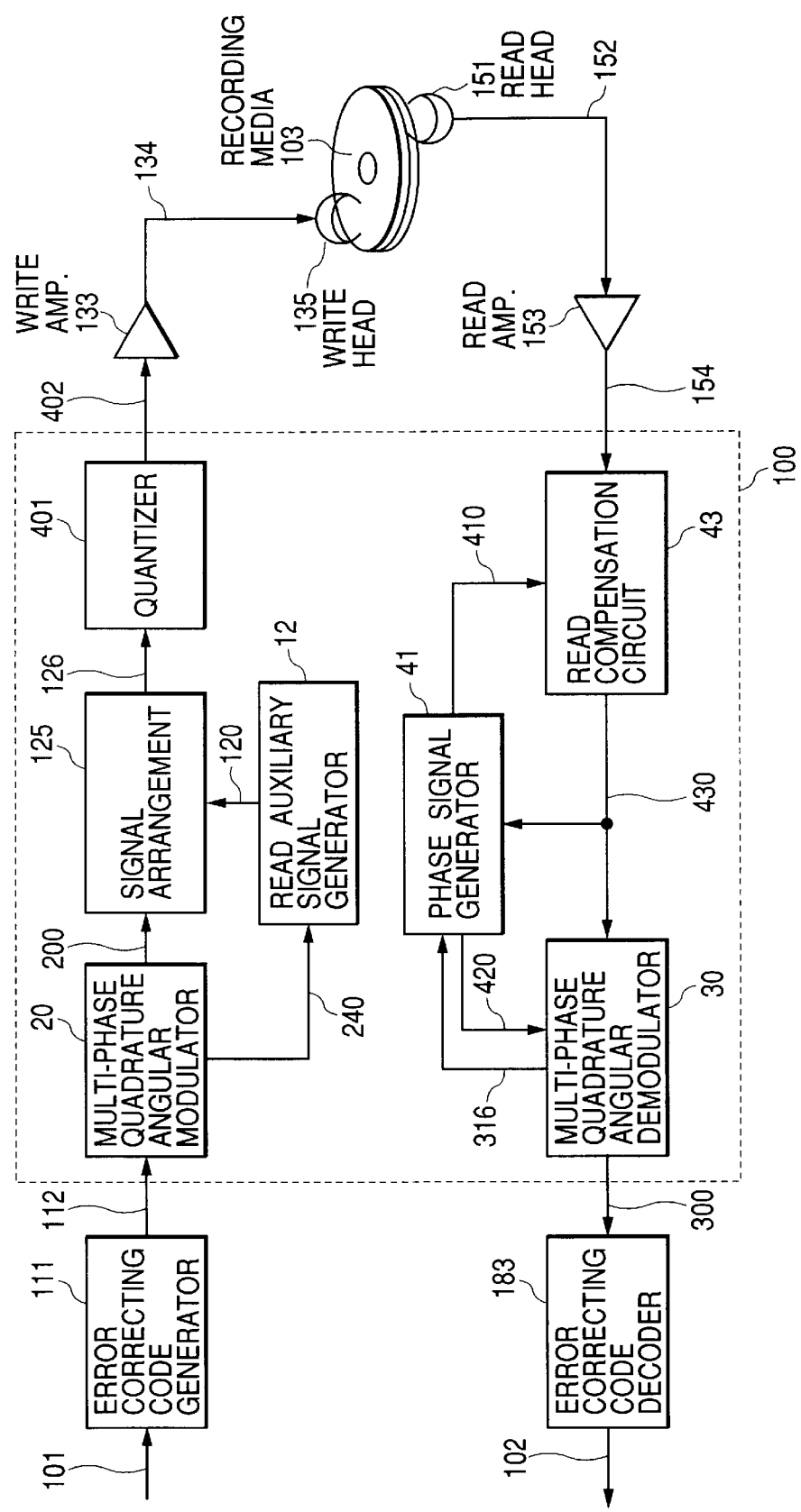
FIG. 1 is a block diagram illustrating the configuration of a magnetic disk apparatus in a recording and reproducing apparatus, which is a preferred embodiment of the present invention.
Figure 2:
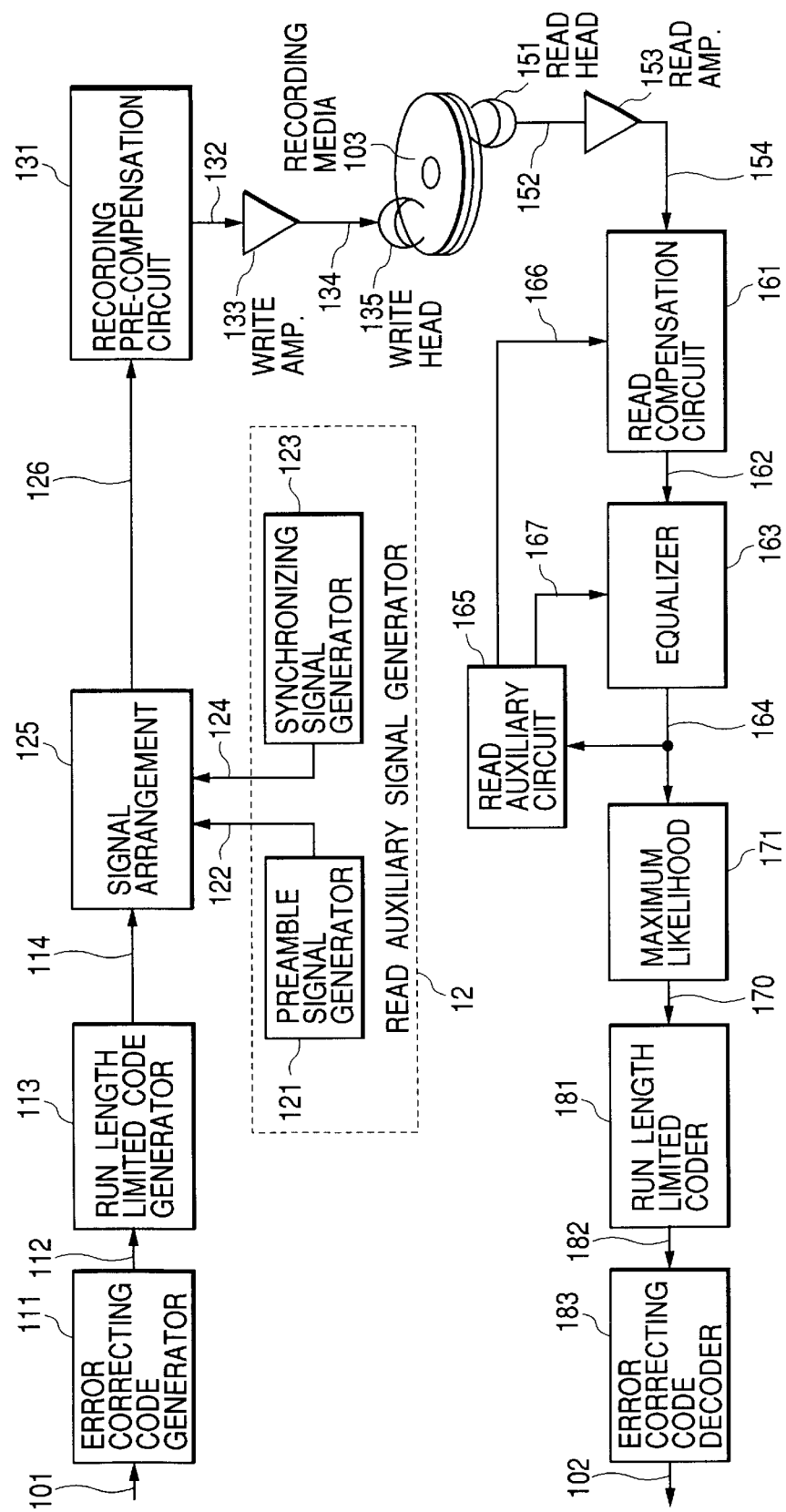
FIG. 2 is a block diagram illustrating the configuration of recording and reproduction in a magnetic disk apparatus according to the prior art.
Figure 3:
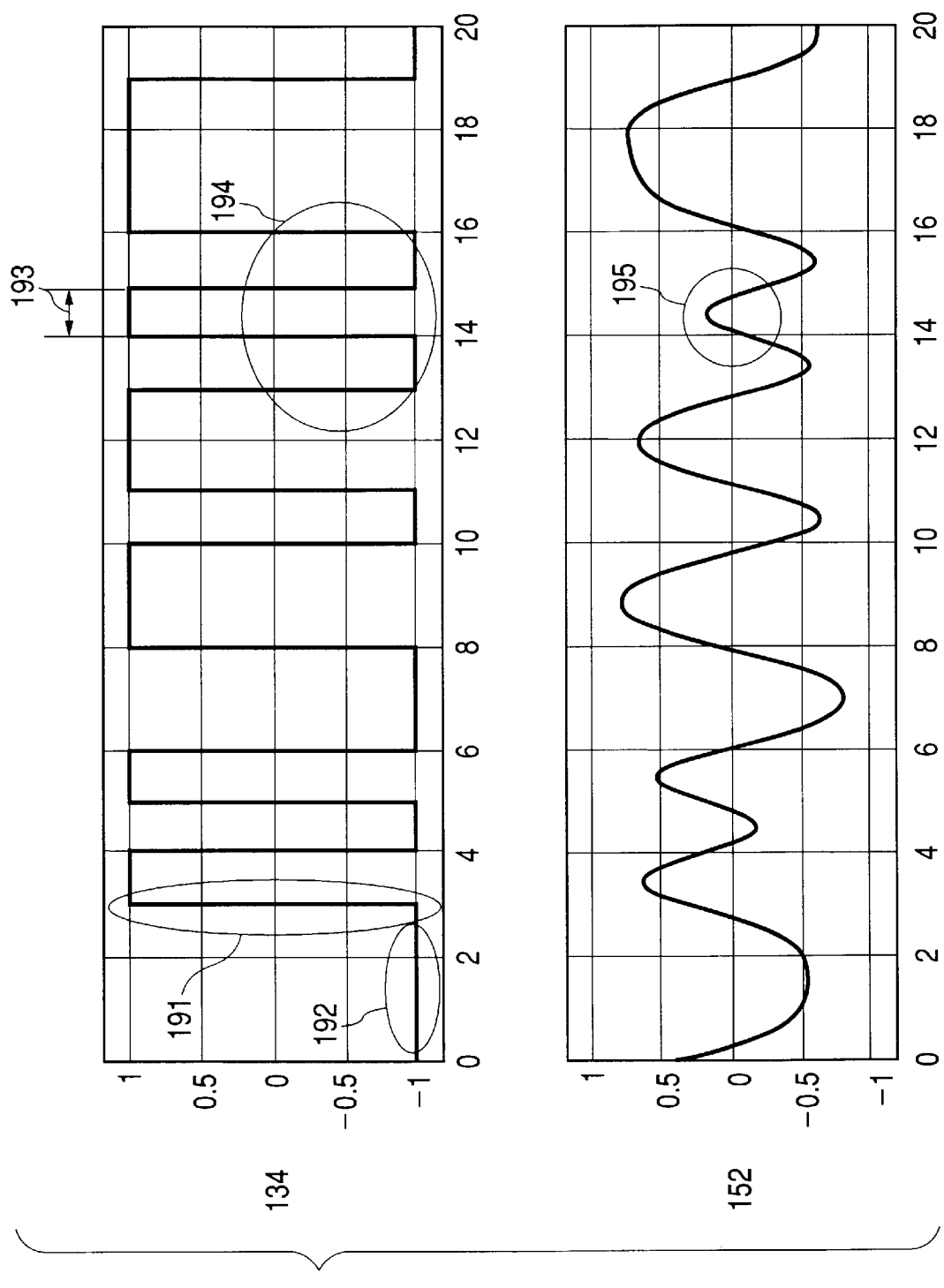
FIG. 3 shows recording/reproduction waveforms in the apparatus according to the prior art.

Referring to FIG. 1, write data 101 are coded into an error correcting code signal by an information error correcting code generator 111. A multi-phase quadrature angular modulator 20 subjects the error correcting code signal 112 to multi-phase quadrature angular modulation to generate a modulated signal 200. On the other hand, the multi-phase quadrature angular modulator 20 generates a cosine wave signal 232 (FIG. 5) used for modulation, and delivers it to a read auxiliary signal generator 12. The read auxiliary signal generator 12 generates a read auxiliary signal 120 on the basis of phase information/amplitude information 240 of the cosine wave signal 232. A signal arrangement circuit 125 arranges the modulated signal 200 and the read auxiliary signal 120 in a sequence that matches a format prescribed for each apparatus, generates a mixed signal 126 and delivers it to a quantizer 401. The quantizer 401 quantizes (makes discrete) the amplitude of the mixed signal 126 to an amplitude level not exceeding what a digital magnetic recording and reproducing apparatus can take (two levels for a magnetic disk apparatus) to generate a rectangular waveform signal 402, and the write current waveform 134 amplified by the write amplifier 133 is recorded onto the recording medium 103 via a write head 135. Here, the part from the multi-phase quadrature angular modulator 20 to the quantizer 401 performs modulation, and this part will be referred to as a modulating device, a modulating circuit or a modulator.

A read head 151 reads a signal recorded on the recording medium 103, which may be a magnetic disk or the like, and acquires a read signal 154 by amplifying this read current signal 152 with a read amplifier 153. A the read compensate circuit 43 compensates the phase and amplitude of the amplified read signal 154 on the basis of phase and amplitude compensation information 410 supplied from a phase signal generator 41, and delivers a compensated read signal 430. The phase signal generator 41 extracts the phase information/amplitude information 240 from the read auxiliary signal, ad delivers a read clock signal 420 to a multi-phase quadrature angular demodulator 30. The multi-phase quadrature angular demodulator 30 demodulates a read signal 430 compensated on the basis of the read clock signal 420. A demodulated signal 300 generated by the multi-phase quadrature angular demodulator 30 undergoes error detection and correction by the error correcting code decoder 183, and read data 102 are delivered. Here, the part from the read compensate circuit 43 to the multi-phase quadrature angular demodulator performs demodulation, and this part will be referred to as a demodulating device, a demodulating circuit or a demodulator. A combination of the modulating apparatus and the demodulating apparatus constitutes the signal processing apparatus. The combination of a modulating apparatus and a demodulating apparatus is usually formed as a read write IC 100, comprising a single package of signal processing apparatus.

Next will be described in detail the multi-phase quadrature angular modulator 20 with reference to FIG. 5.

The multi-phase quadrature angular modulator 20 is composed of a serial to parallel converter 211, a multi-level signal generator 213, a base-band pulse generator 221, an integrator 223, a base-band modulator 225, a carrier signal generator 23, multipliers 235 and 237, and an adder 238.

First, the error correcting code signal 112 is entered into the serial to parallel converter 211. The serial to parallel converter 211 stores k bits of the error correcting code signal in a buffer, and supplies the k bits of the signal via k paths at the same time (212). Next, the multi-level signal generator 213 combines parallel output signals 212 resulting from parallel supply of the k bits of the error correcting code signal to generate a multi-level signal 210 of two levels. The base-band pulse generator 221 generates base-band pulse signals 222 matching different modulation systems, and delivers them to the integrator 223. The integrator 223 subjects the multi-level signal 210 and the base-band pulse signal 222 to convolutional integration and delivers a phase signal 224. The base-band modulator 225 supplies a first base-band modulated signal 226 expressed in a cosine wave having the phase signal 224 as its phase angle and a second base-band modulated signal 227 expressed in a sine wave.

On the other hand, in the carrier signal generator 23, a cosine signal generator 231 generates the cosine wave signal 232 with reference to a clock frequency 230 and the phase information/amplitude information 240 of this cosine wave signal. This phase information/amplitude information 240 is delivered to the read auxiliary signal generator 12. A phase shifter 233 generates a sine wave signal 234 resulting from varying the phase of this cosine wave signal 232 by 90 degrees. The cosine wave signal 232 generated by the cosine signal generator 231 is used as a first carrier signal, and the sine wave signal 234 generated by the phase shifter 233, as a second carrier signal. The first multiplier 235 multiplies the cosine wave signal 232 and the first base-band modulated signal 226 by each other, and the second multiplier 237 multiplies the sine wave signal 234 and the second base-band modulated signal 227 by each other. An adder 239 adds a cosine modulated signal 236 and a sine modulated signal 238 which are the outputs of the first and second multipliers, respectively, to generate the modulated signal 200.

Figure 7:
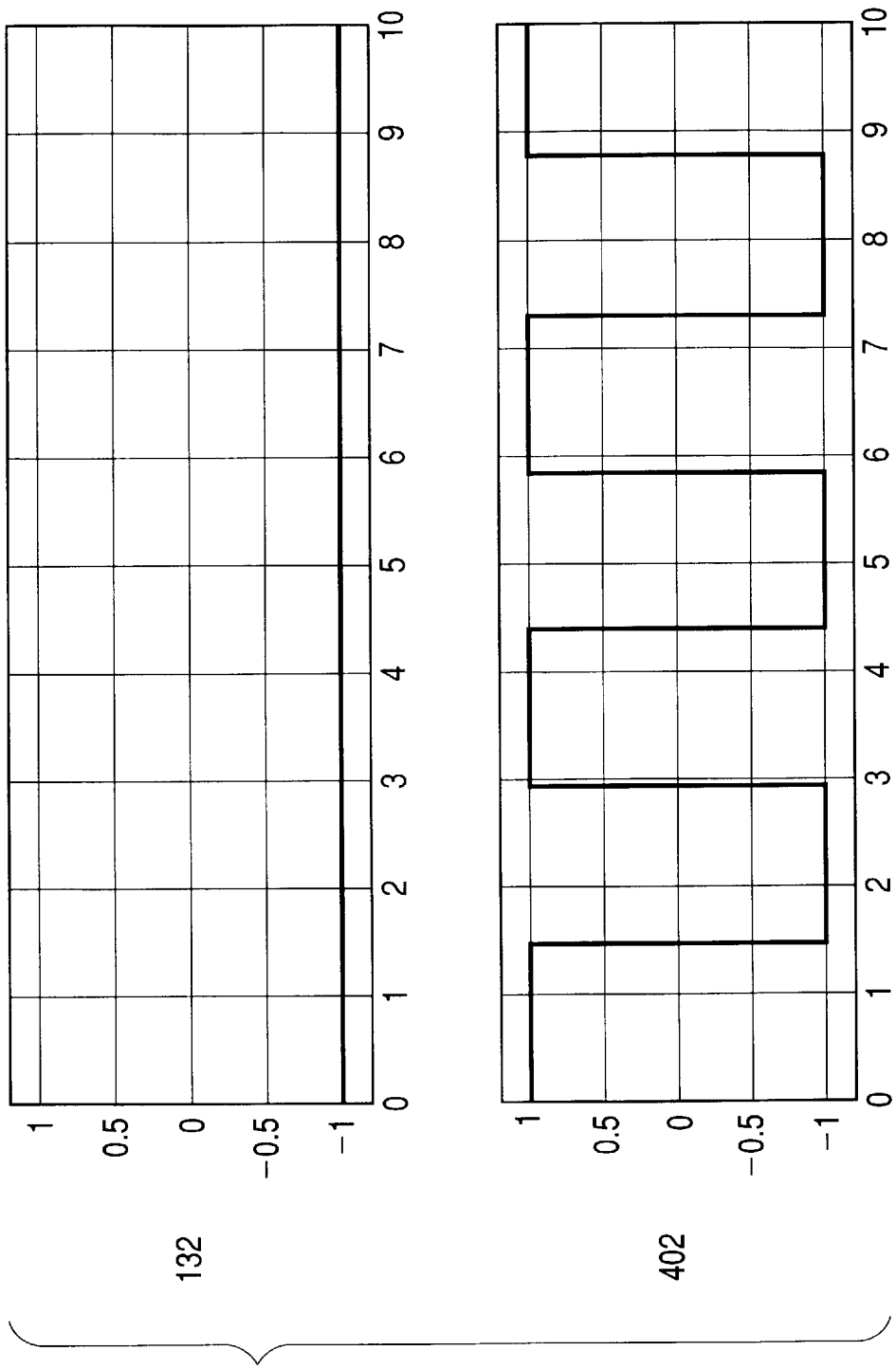
FIG. 7 shows recording waveforms in the preferred embodiment of the invention into which a 0 run has been inserted.

Next will be described, with reference to FIG. 7, a case in which the signal 112 entered into this modulator 20 consists of a permitted number of consecutive zeros (hereinafter referred to as a 0 run). Since according to the prior art the write waveform is within the RLL restrictions, it will be the write current waveform 132 subject to no magnetic inverting force. Unlike that, according to the present invention in which signals expressing four-level information in the phasic direction by putting together two bits into each unit, the rectangular waveform signal 402 which constitutes the write signal is inverted in magnetization once every two bits. The intervals of this magnetization inversion are dependent on the number of bits supplied in parallel. For these reasons, no RLL coder is needed, which otherwise would be used for controlling the intervals of magnetization inversion.

Next will be described in detail, with reference to FIG. 6, the multi-phase quadrature angular demodulator 30 shown in FIG. 1.

The multi-phase quadrature angular demodulator 30 consists of a cosine signal generator 317, a multiplier 311, a low pass filter (LPF) 313, a base-band signal demodulator 32 and a compensation signal generator 315.

The read clock signal 420 supplied from the phase signal generator 41 is entered into the cosine signal generator 317. The cosine signal generator 317 generates a cosine carrier signal 318 of the same phase as the read clock signal 420. The multiplier 311 multiplies the compensated read signal 430 and the cosine carrier signal 318, generated on the basis of the read clock signal, by each other, and delivers abase-band signal 312. The LPF 313 clears the base-band signal 312 of its harmonic component. The base-band signal demodulator 32 demodulates an LPF output signal 314 in a manner matching the modulation system of the multi-phase quadrature angular modulator 20, and delivers the demodulated signal 300.

The base-band signal demodulator 32, if it detects a phase lag from information on demodulation error or the like, delivers a phase lag detection signal 310. The compensation signal generator 315 delivers, on the basis of the phase lag detection signal 310, phase compensation information 316 to the phase signal generator 41.

Now will be described the modulating/demodulating system in the present invention using continuous phase modulation (CPM modulation) as the system of modulation used by the multi-phase quadrature angular modulation means. In this case, the multi-phase quadrature angular modulator 20 of FIG. 1 is a CPM modulator and the multi-phase orthogonal signal demodulator 30, a CPM demodulator.

Figure 5:
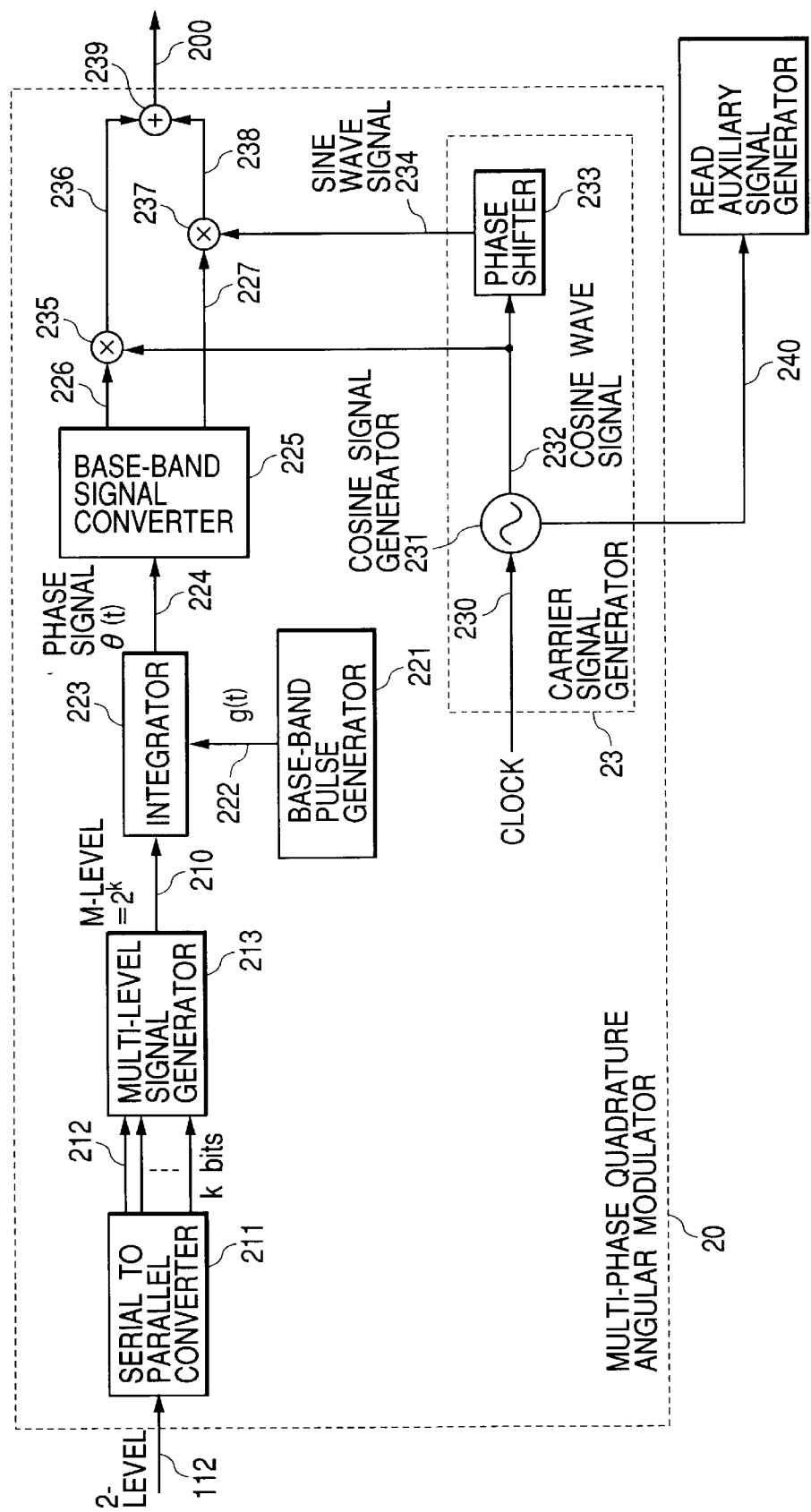
FIG. 5 shows in detail the configuration of a multi-phase quadrature angular modulator 20 in the preferred embodiment of the invention.

Referring to FIG. 5, write data 101 are converted into an error correcting code signal by the error correcting code generator 111. The information 112 converted into an error correcting code signal is entered into the CPM modulator 20. Within this CPM modulator 20, the serial to parallel converter 211 and the multi-level signal generator 213 generate the multi-level signal 210 of $2^k$ levels (M levels) in which k (212) information bits converted into error correcting codes are combined. The integrator 223 convolutes a base-band pulse signal g(t) (222) generated by the base-band pulse generator 221 and the multi-level signal 210, and generates a continuously varying phase signal θ(t) (224). The phase signal 224 is entered into the base-band modulator 225, which generates the base-band modulated signals 226 and 227. The first and second multipliers 235 and 237 multiply these base-band modulated signals 226 and 227 by the carrier signals 232 and 234 generated by the carrier signal generator 23, and the resultant products are added by the first adder 239, resulting in the generation of a modulated waveform s(t) (200), This modulated waveform s(t) (200) can be expressed by:

$$s(t) = \left[\sum_{n=-\infty}^{\infty} g(t-nT)\cos\phi(t)\right]\cos(2\pi f_c t) - \left[\sum_{n=-\infty}^{\infty} g(t-nT)\sin\phi(t)\right]\sin(2\pi f_c t)$$

(Equation 1)

where T is the bit period.

Figure 4:
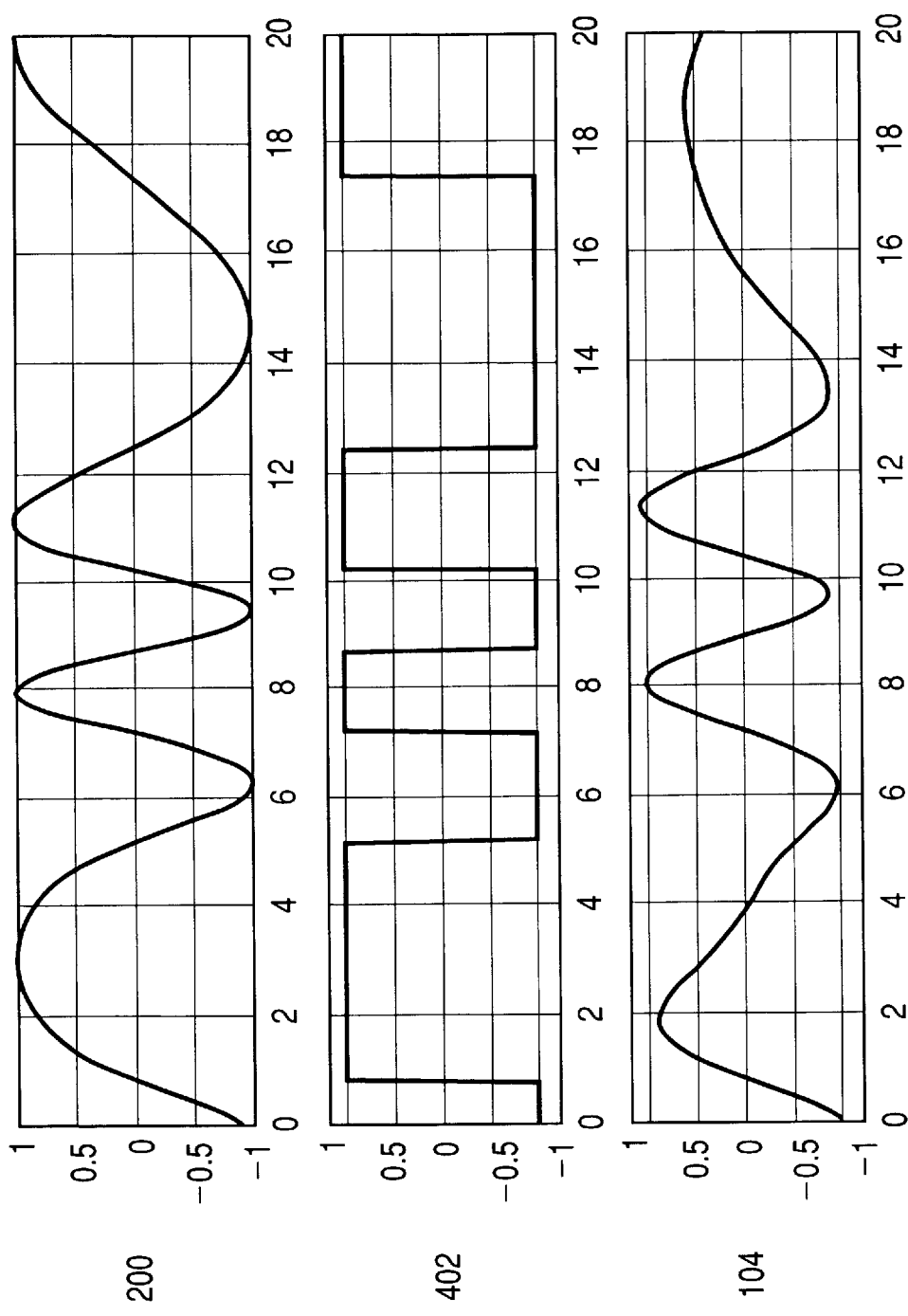
FIG. 4 shows recording waveforms in the preferred embodiment of the invention.

That modulated waveform 200 is entered into the quantizer 401 shown in FIG. 1. The quantizer 401 generates the two-level rectangular waveform signal 402 having as its threshold a point where the amplitude becomes 0 (hereinafter referred to as the zero cross point). The write amplifier 133 amplifies this rectangular waveform signal 402 as a write current, which is written onto the recording medium 103 via the write head 135. The modulated waveform 200, the rectangular waveform signal 402 and a write waveform 104 are shown in FIG. 4.

Figure 6:
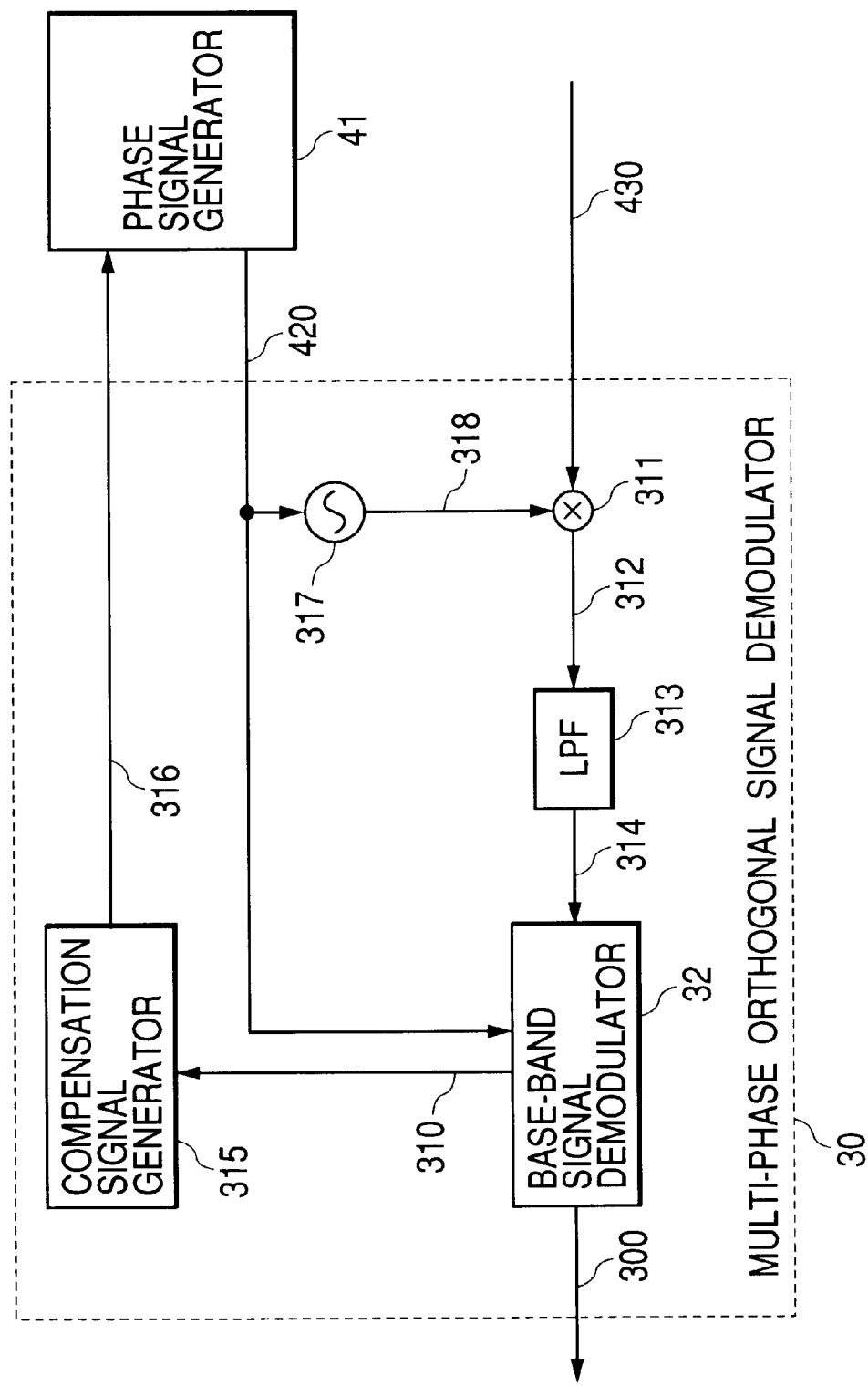
FIG. 6 shows in detail the configuration of a multi-phase quadrature angular demodulator 30 in the preferred embodiment of the invention.

In the CPM demodulator 30 shown in FIG. 6, the base-band signal demodulator 32 performs demodulation in a manner matching the modulation system of CPM.

According to the invention, even where the choice of amplitude is limited to two levels as in a magnetic disk apparatus, signals can be expressed by the timing of amplitude variation. By controlling this timing, it is made possible to keep the minimum interval of the inversion of magnetization narrower than according to the prior art. Also by using a multi-phase quadrature angular modulator and a quantizer, to be described below in further detail, the interval of amplitude inversion of write signals can be controlled.

Regarding the system of expressing information by phase differences used in the first preferred embodiment of the invention (continuous-phase phase shift keying, hereinafter abbreviated to the CPPSK system), the configuration of the modulator will be described with reference to FIG. 5, and that of the demodulator, with reference to FIG. 6. The multi-phase quadrature angular modulator 20 of FIG. 5 is supposed to be a CPPSK modulator, and the multi-phase quadrature angular demodulator 30 of FIG. 6, a CPPSK demodulator.

The information 112 converted into an error correcting code signal is entered into the CPM modulator 20, and undergoes base-band modulation. The base-band pulse signal 222 of the CPPSK modulation system is expressed as:

$$g(t) = \sin\frac{\pi t}{T} \quad \text{(Equation 2)}$$

The integrator 223 convolutes this base-band pulse signal 222 and the multi-level signal 210 to generate the phase angle 224. By performing modulation using this phase signal 224, the CPPSK demodulated signal 200 is generated.

In the CPPSK demodulator 30 of FIG. 6, the cosine signal generator 317 generates the cosine carrier signal 318 on the basis of the read clock signal 420 delivered from the phase signal generator 41. This cosine carrier signal 318 and the compensated read signal 430 are multiplied by each other to generate the base-band signal 312. The LPF delivers a signal 314 resulting from the removal of harmonic components from the base-band signal 312 to the base-band signal demodulator 32. Here, the base-band signal demodulator 32 performs ML demodulation. The likelihood of the path is figured out from the base-band signal 314, and the demodulated signal 300 is supplied. This signal 300 is sent to the error correcting code decoder 183.

This embodiment of the invention can use the CPPSK system as one of signal processing systems for information recording apparatuses which make the amplitude level discrete and limit the choice of amplitude level by varying the amplitude instead of relying on the bit period. Demodulation by the ML sequence detection method is also made possible then.

Figure 8A:
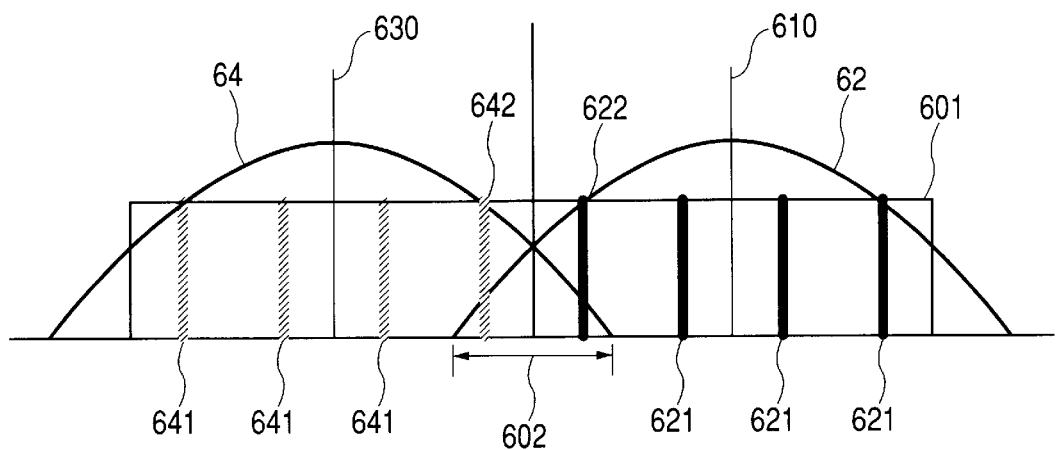
FIG. 8 shows the frequency spectra of a four-level CPPSK system in a second preferred embodiment of the invention.
Figure 8B:
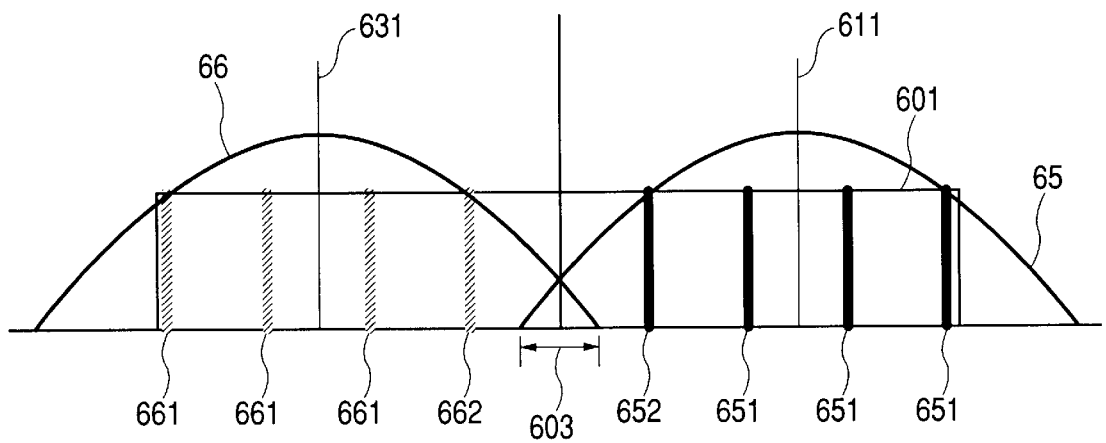

A technique of suppressing interference by a reflected component will now be described as a second preferred embodiment of the invention with reference to the frequency spectral diagrams of the four-level CPPSK system shown in FIG. 8. FIG. 8(A) is a spectral diagram of a case in which the frequency of the carrier is set at the center of the band, and FIG. 8(B), a spectral diagram of a case in which the frequency of the carrier is set off the center of the band. In FIG. 8, reference numeral 601 denotes a Nyquist frequency band; 602, an interference band; 610, the spectrum of a carrier whose frequency is set at the center of the band; 611, the spectrum of a carrier whose frequency is set off the center of the band; 62, the spectral band of a modulated signal whose carrier frequency is set at the center of the band; 621, the spectrum of a signal present in a band where no interference occurs; 622, the spectrum of a signal present in a band where interference does occur; 630, the spectrum of a carrier whose carrier frequency is set at the center of the band (the negative side of the frequency); 631, the spectrum of a carrier whose carrier frequency is set off the center of the band (the negative side of the frequency); 64, the spectral band of a modulated signal whose carrier frequency is set at the center of the band (the negative side of the frequency); 641, the spectrum of a signal present in a band where no interference occurs (the negative side of the frequency); 642, the spectrum of a signal present in a band where interference does occur (the negative side of the frequency), 65, the spectral band of a modulated signal whose carrier frequency is set at the center of the band; 651, the spectrum of a signal present in a band where no interference occurs; 652, the spectrum of a signal present in a band where interference does occur; 66, the spectral band of a modulated signal whose carrier frequency is set off the center of the band (the negative side of the frequency); 661, the spectrum of a signal present in a band where no interference occurs (the negative side of the frequency); and 662, the spectrum of a signal present in a band where interference does occur (the negative side of the frequency).

Referring to FIG. 5, the information 112 converted into an error correcting code as described with reference to the first embodiment of the invention is entered into the CPM modulator 20. In the CPM modulator 20, the base-band modulated signals 226 and 227 and the carrier signals 232 and 234 are multiplied by each other, respectively. The resultant modulated signals 200 become modulated signals modulated with a cosine wave carrier. With reference to FIG. 8(A) now, if the frequency of the carrier signals 232 and 234 of FIG. 5 is set at the center of the Nyquist band (610), the spectrum 62 of the modulated signal 200 will be formed. The frequency components which the information signals then have are like 621 and 622. As acosine wave carrier is used, a similar spectrum (64) emerges on the negative side of the frequency with a frequency f=0 as the axis of symmetry. These spectra 62 and 64 on the positive and negative sides give rise to the reflection of frequency (i.e. an interference area 602) on the lower side of the frequency band. This reflected component 602 interferes with the signal 622 having the lowest frequency component.

Against this interference, use of a carrier having a higher frequency than the center of the write frequency band (611) as shown in FIG. 8(B) results in shifting of the frequency band of the signal toward a higher range. This prevents an interference 603 due to the reflection in the lower range from affecting the lowest frequency 652 which the information signal has. Therefore, the signal 652 having the lowest frequency component is prevented from distortion by shifting the frequency components 651 and 652 which the information signal has toward the higher range within the extent of the Nyquist band.

As described above, this embodiment of the invention can prevent interference in the frequency band invited by the reflection of the cosine wave carrier, and thereby protect signals from distortion.

Regarding the system of expressing information by phase differences used in the third preferred embodiment of the invention (the continuous-phase frequency shift keying system, hereinafter abbreviated to the CPFSK system), the configuration of the modulator will be described with reference to FIG. 5, and that of the demodulator, with reference to FIG. 6. The multi-phase quadrature angular modulator 20 of FIG. 5 is supposed to be a CPFSK modulator, and the multi-phase quadrature angular demodulator 30 of FIG. 6, a CPFSK demodulator.

Referring to FIG. 5, the information 112 converted into an error correcting code is entered into the CPM modulator 20 to undergo base-band modulation. The base-band pulse signal 222 of the CPFSK modulation system is expressed as:

$$g(t)\frac{\sin\left(\pi\frac{t}{T}\right)}{\pi\frac{t}{T}} \cdot \frac{\cos\left(\pi\beta\frac{t}{T}\right)}{1-\left(2\beta\frac{t}{T}\right)^2} \quad \text{(Equation 3)}$$

The integrator 223 convolutes this base-band pulse signal 222 and the multi-level signal 210 to generate the phase angle 224. Modulation using this phase signal 224 causes the CPFSK modulated signal 200 to be generated.

In the CPPSK demodulator 30 of FIG. 6, the cosine signal generator 317 generates the cosine carrier signal 318 on the basis of the read clock signal 420 delivered from the phase signal generator 41. This cosine carrier signal 318 and the compensated read signal 430 are multiplied by each other to generate the base-band signal 312. The LPF delivers the signal 314 resulting from the removal of harmonic components from the base-band signal 312 to the base-band signal demodulator. Here, the base-band signal demodulator 32 of FIG. 6 will have a configuration like that of the CPFSK demodulator 320 shown in FIG. 9 if a delayed detection system is used.

Figure 9:
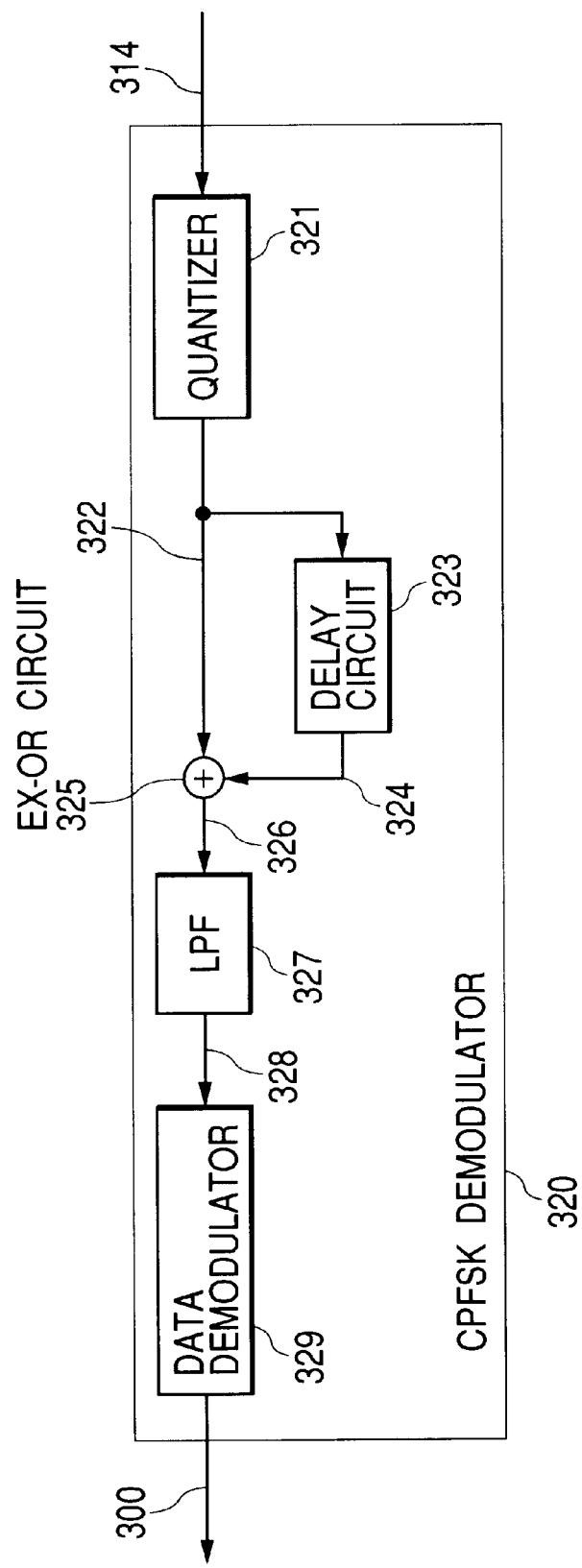
FIG. 9 shows the configuration of a demodulator of a CPFSK system in a third preferred embodiment of the invention.

Referring to FIG. 9, a quantizing means 321 quantizes the base-band signal 314 at the zero cross point to generate a base-band rectangular waveform signal 322. The base-band rectangular waveform signal gives a waveform 324 delayed by an infinitesimal length of time by a delay circuit 323. An Ex-OR circuit 323 subjects the base-band rectangular waveform signal 321 and the waveform 324 delayed by an infinitesimal length of time to Ex-OR operation to generate an amplitude-inverted pulse signal 326 in which a pulse rises where the amplitude is inverted. An LPF 327 converts frequency information which the amplitude-inverted pulse signal 326 has into amplitude information. A data demodulator 329 demodulates an amplitude information signal 328 to generate a demodulated signal. When doing so, the data demodulator can as well use ML decoding.

To this embodiment of the invention, the CPFSK system can be applied as a signal processing system for use in information recording wherein the amplitude level is made discrete and the choice of amplitude level is limited. The application the CPFSK system makes possible the use of a demodulation system such as the delayed detection system.

Figure 10:
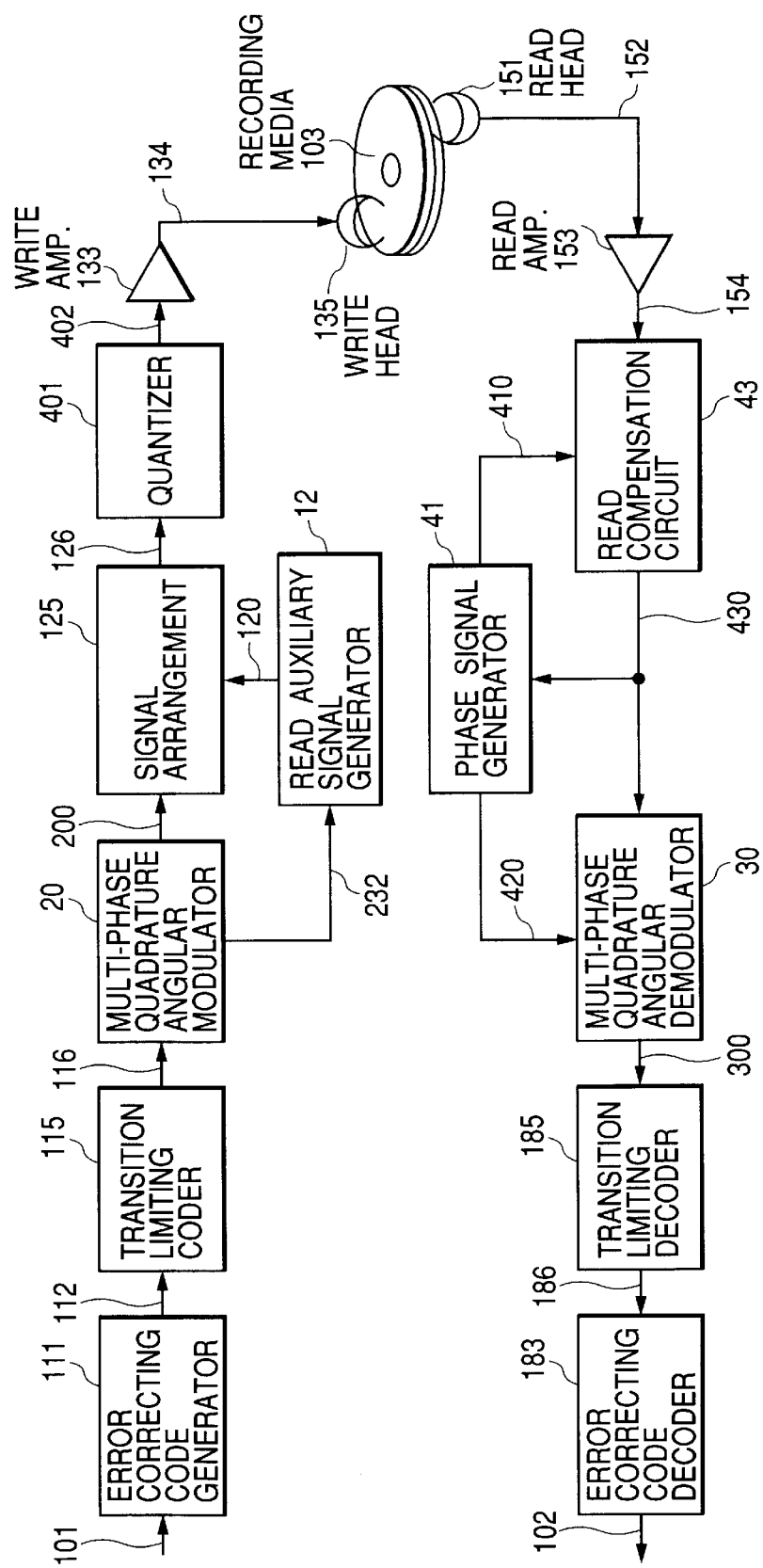
FIG. 10 shows the configuration of a recording and reproducing system in a fourth preferred embodiment of the invention wherein frequency transition limited coding is added.

A fourth preferred embodiment of the invention will now be described with reference to the configuration diagram of FIG. 10 illustrating a system to which frequency transition limited coding is added. The information 112 converted into an error correcting code is subjected to coding to limit the transition of frequency by a transition limiting coder 115. This coded signal 116 having undergone frequency transition limiting is modulated by the CPFSK modulator 20 and written. The signal that has been read out, after being demodulated by the CPFSK demodulator 30, undergoes frequency transition-limited decoding by a transition limiting decoder 185, and a decoded signal 186 is delivered to an error correcting decoder 19.

This embodiment of the invention can suppress, in a modulation/demodulation system expressing information in phase or frequency, the occurrence of errors by limiting frequency transition even where a steep frequency change takes place from a signal having the lowest frequency component to a signal having the highest frequency.

Figure 11:
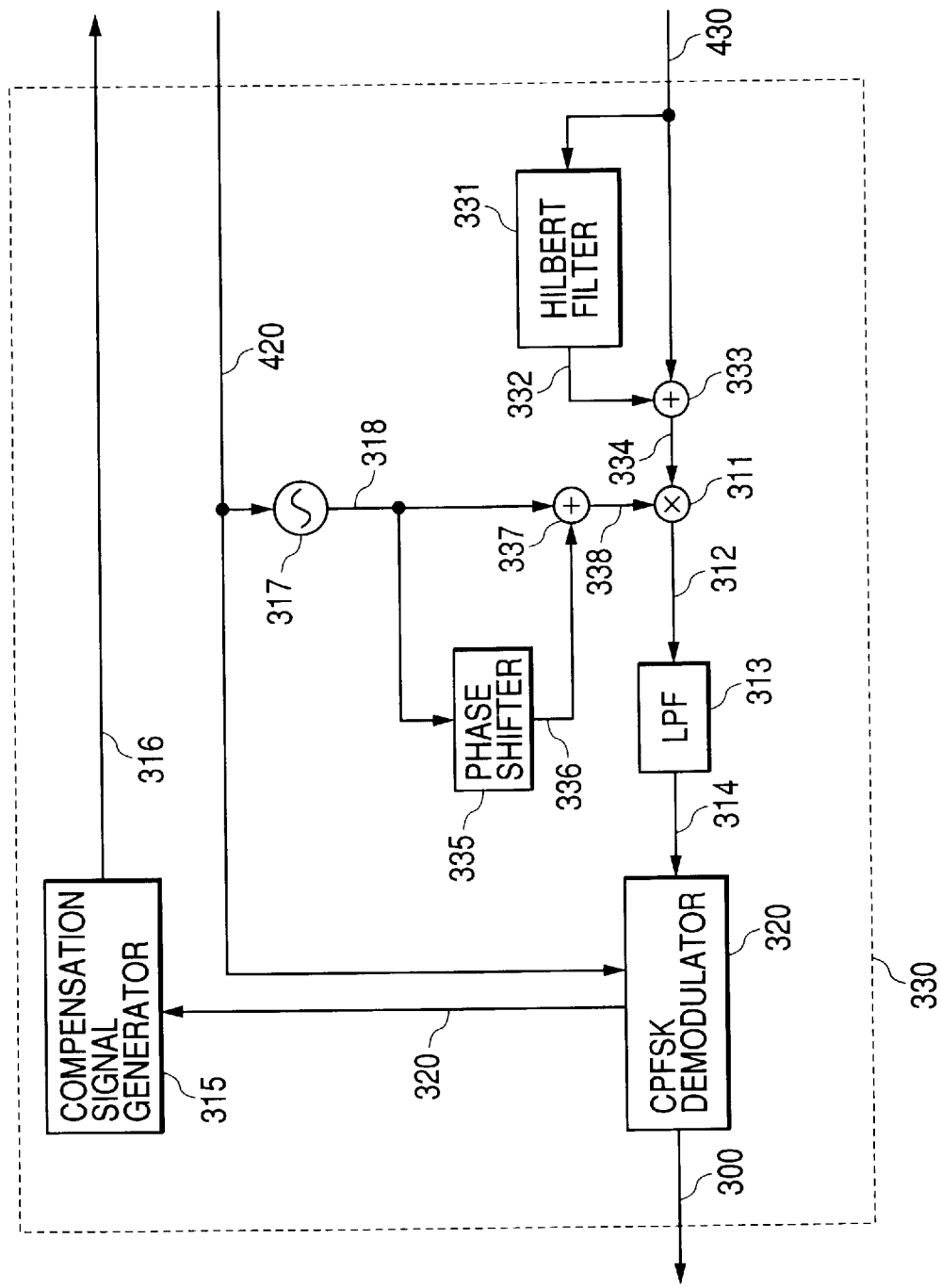
FIG. 11 shows the configuration of a CPFSK demodulator containing a Hilbert filter in a fifth preferred embodiment of the invention.

As a fifth preferred embodiment of the invention, a system by which demodulation is accomplished with a carrier of $\exp(j2\pi f_c t)$ will be described below with reference to a configuration diagram of the CPFSK demodulator containing a Hilbert filter shown in FIG. 11. This Hilbert filter is a filter for realizing Hilbert transform. Hilbert transform generates a sine carrier component $\sin(2\pi f_c t)$ from a cosine carrier signal $\cos(2\pi f_c t)$. By combining these cosine carrier signal and sine carrier signal, a complex carrier signal is generated in accordance with Euler's theorem: $\exp(j2\pi f_c t)=\cos(2pf_c t)+j\sin(2pf_c t)$.

The signal 200 modulated with a cosine carrier signal $\cos(2pf_c t)$ having only a real component as in the first through fourth embodiments of the invention is recorded and reproduced. The waveform 104 read out on the read side undergoes read signal compensation by the read compensate circuit 43. The compensated read signal 430 is entered into the CPFSK demodulator 330. A Hilbert filter 331 generates from the compensated read signal 430 a signal 332 having an imaginary component $j\sin(2\pi f_c t)$ as its carrier. By adding with an adder 333 the real read signal 430 and the imaginary output signal 332 generated by the Hilbert filter, a complex carrier modulated signal 334 is generated.

On the other hand, the read clock signal 420 generated by the phase signal generator 41 is entered into the cosine waveform generator 317 to generate the cosine carrier signal 318. The cosine carrier signal 318 is entered into a phase shifter 335, which delivers a sine carrier signal 336 whose phase is varied by 90°. An adder 337 adds a cosine carrier signal 318 and the sine carrier signal 336 to obtain a complex carrier signal 338. The multiplier 311 multiplies this complex carrier signal 338 and the complex carrier modulated signal 334 by each other, and delivers the base-band signal 312. This base-band signal 312 is demodulated in the same manner as in the third embodiment of the invention.

According to this embodiment of the invention, even an apparatus which is unable to record both a real carrier signal and an imaginary carrier signal by reason of recording density or otherwise can demodulate them as a complex carrier signal having both real and imaginary components. Accordingly, a harmonic component having a component of double the carrier frequency can be removed.

As a sixth preferred embodiment of the invention, a system in which interference by harmonic components is removed by doubling the demodulating frequency in the complex signal CPFSK system using a Hilbert filter, which is the fifth embodiment of the invention, will be described with reference to FIG. 11, which is the configuration diagram of the CPFSK demodulator containing the Hilbert filter, and FIG. 12, which is a frequency spectral diagram of the base-band modulated signal having undergone carrier demodulation.

Figure 12A:
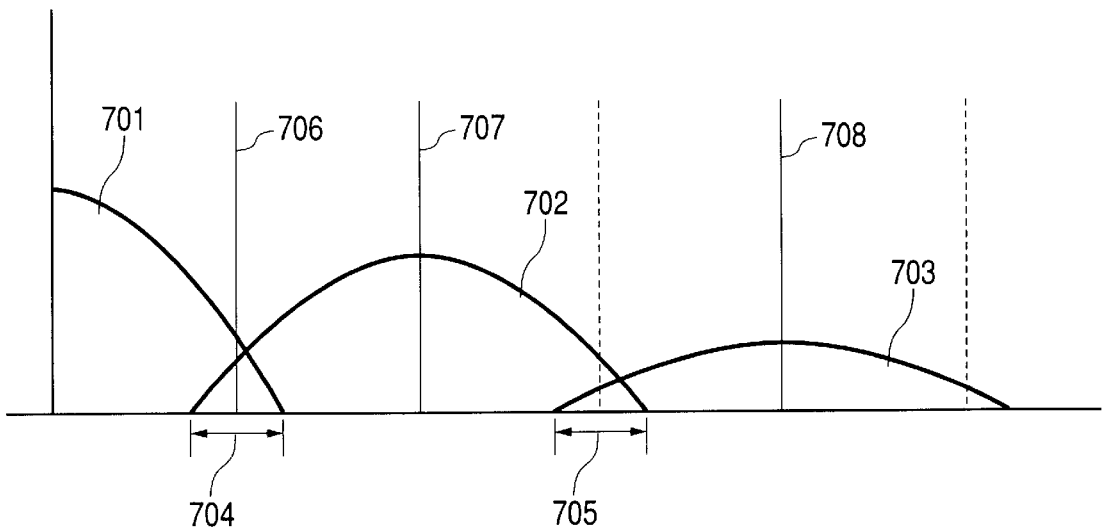
FIG. 12 shows frequency spectra of base band signals carrier-demodulated in a sixth preferred embodiment of the invention.
Figure 12B:
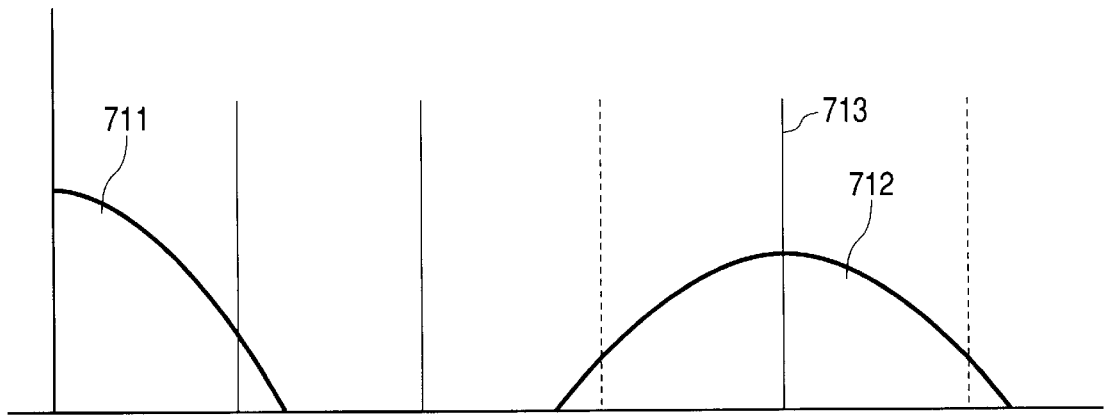

FIG. 12(A) shows the spectrum of a demodulated wave resulting from regular demodulation, and FIG. 12(B), that of a demodulated wave resulting from demodulation using a doubled frequency. In the diagram, reference numeral 701 denotes the spectral band of the fundamental wave; 702, the spectral band of the third harmonic; 703, the spectral band of the fifth harmonic; 704, the interference band between the reference was and the harmonics; 705, the interference band between the harmonics; 706, the carrier frequency; 707, the carrier frequency of the third harmonic; 708, the carrier frequency of the fifth harmonic; 711, the spectral band of the fundamental wave; 712, the spectral band of the third harmonic; and 713, the carrier frequency of the third harmonic.

Since the CPFSK system is a frequency modulation system, there are harmonic spectra 702 and 703 in positions 707 and 708 around the multiples of the carrier frequency 706 by even integers (2n, n=1, 2, 3, . . . ). Especially the harmonic spectrum 702 referred to as the third harmonic, which adjoins the fundamental wave spectrum 701 needed for demodulation interferes with the fundamental wave spectrum 701 in a band 704.

Referring here to FIG. 12, the read clock signal 420 generated by a phase generator circuit 423 is entered into a cosine signal generator. Then, the cosine signal generator 317 generates the cosine carrier signal 318 having a frequency of an odd multiple of (triple here) that of the carrier used for demodulation. The base-band signal 312 is generated using the phase shifter 335 and the adder 337 in the same manner as in the fourth embodiment of the invention. In the frequency spectrum 71 of this doubled base-band signal 312, the center frequency of the third harmonic 712 is doubled (713), and it has no interference band with the fundamental wave 71. Therefore, the fundamental wave alone can be demodulated by attenuating the harmonic components with an LPF.

This embodiment can eliminate the influence of harmonic components which invite interference in the frequency modulation system.

Figure 13:
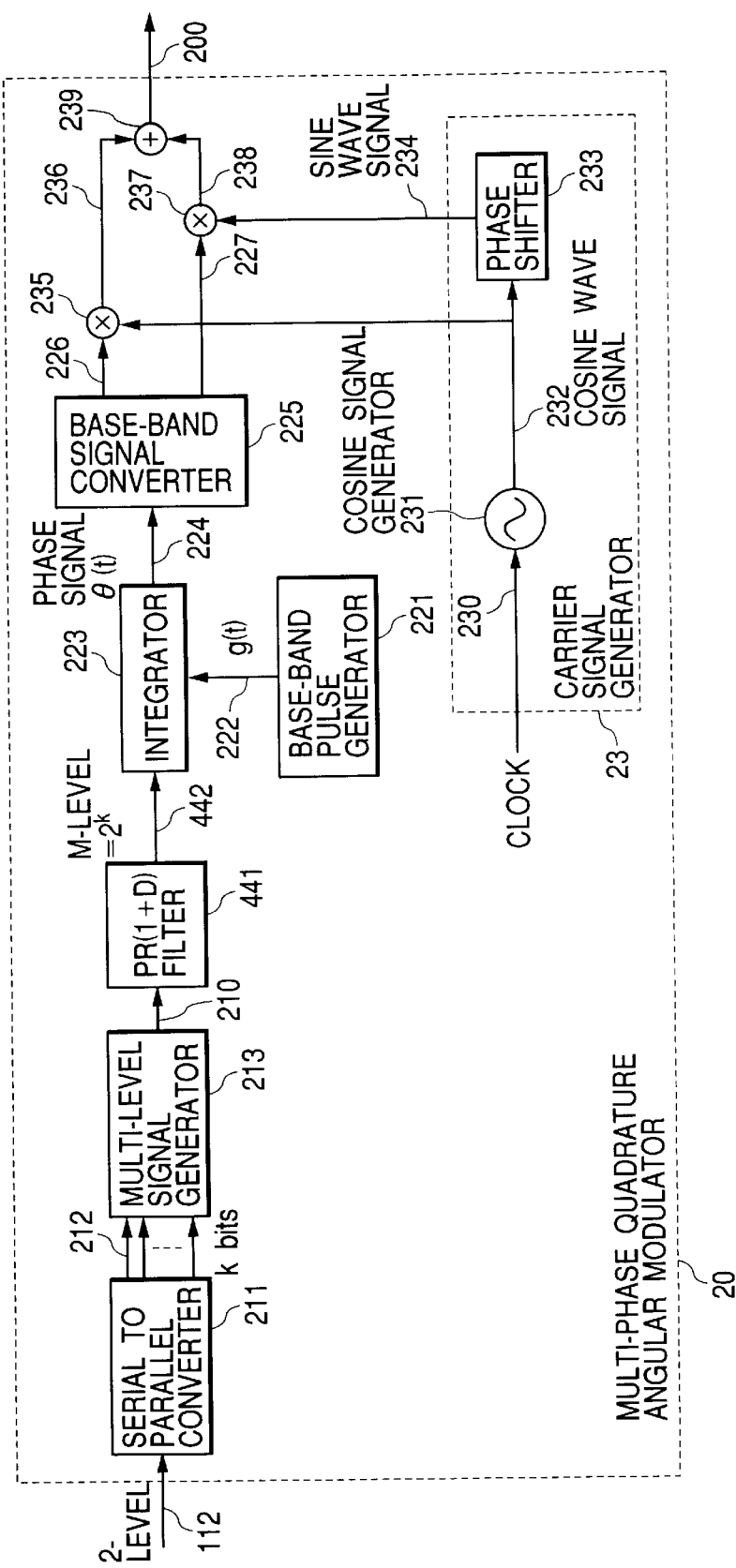
FIG. 13 shows the configuration of a modulator to which a partial response system is added in a seventh preferred embodiment of the invention.
Figure 14:
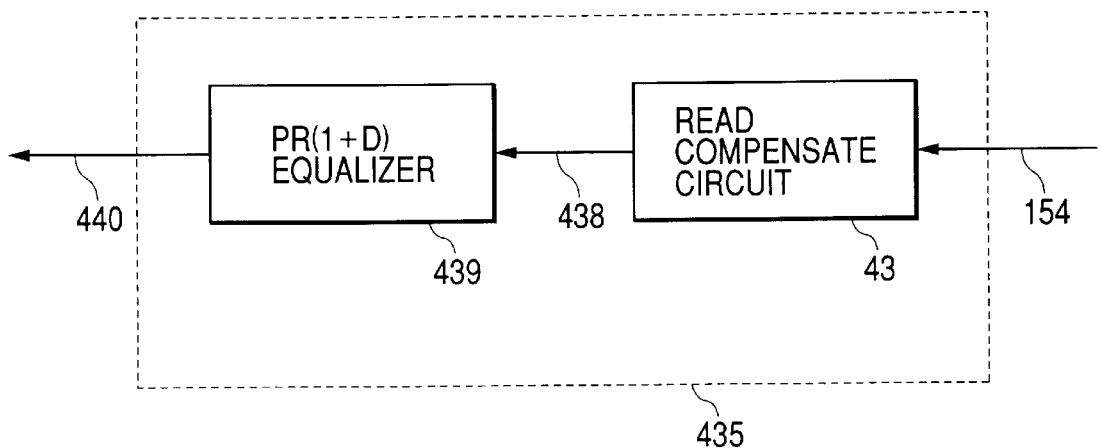
FIG. 14 shows the configuration of a read compensate circuit to which the partial response system is added in the seventh preferred embodiment of the invention.

As a seventh preferred embodiment of the invention, a system in which interference by harmonic components is removed by concentrating frequency components are concentrated in a narrow band using the PR system as the band limiting technique will now be described with reference to FIG. 13, which is the configuration diagram of the CPM modulation system augmented with the PR system, FIG. 14, which is the configuration diagram of a PR characteristic-added read compensation circuit of the CPM system augmented with the PR system, and FIG. 15, a frequency spectral diagram of the CPM system augmented with the PR system.

A filter 441 having a characteristic of PR(1+D) (denoting a signal delayed by one bit, where D is a delay element) within the CPM modulator 20 generates a PR signal 442 by adding the multi-level signal 210 and a signal resulting from the delaying of the multi-level signal 210 by one symbol. The integrator 223 convolutes this PR signal 442 and the base-band pulse signal 222, and delivers the phase angle 224 to the base-band modulator. Recording or reproduction is accomplished by modulating and quantizing this signal in accordance with the procedure of the foregoing embodiment.

On the reproduction side, the read signal 154 is entered into a PR characteristic-added read compensation circuit 435. The PR characteristic-added read compensation circuit 435 consists of the read compensate circuit 43 and a PR(1−D) characteristic equalizer 439. Within the PR characteristic-added read compensation circuit 435, the read signal 154 undergoes waveform shaping by the compensate circuit 43, which performs waveform shaping. The PR(1−D) characteristic equalizer 439 equalizes a signal 438 having undergone waveform shaping to provide it with a PR(1−D) characteristic, and delivers the resultant equalized signal to the multi-phase quadrature angular modulator 30 as a compensated read signal 440.

Figure 15:
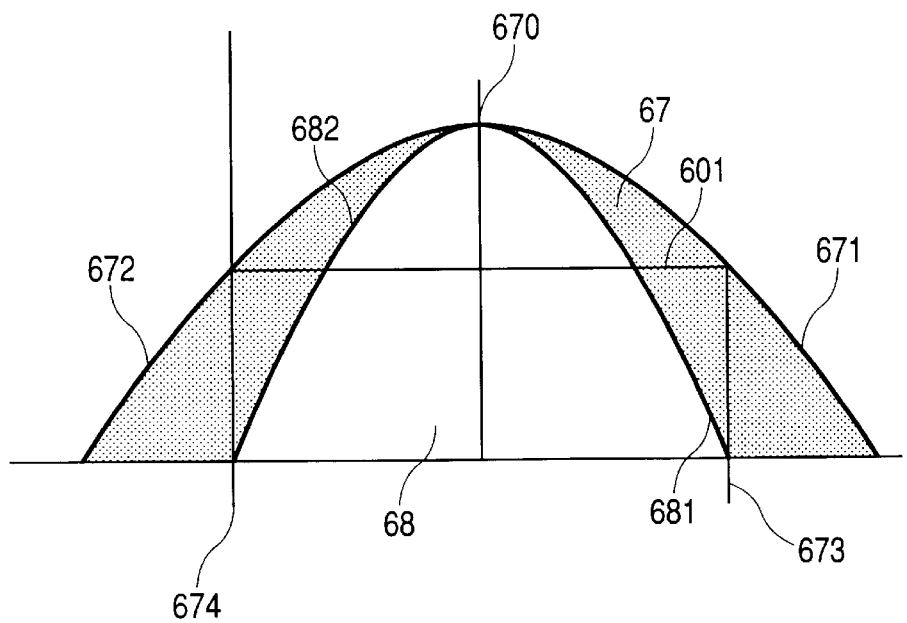
FIG. 15 shows a frequency spectrum of a CPM system to which the partial response system is added in the seventh preferred embodiment of the invention.

FIG. 15 shows the aforementioned variation of the frequency spectrum done by the PR(1+D) characteristic filter 441 and the PR(1−D) characteristic equalizer 439.

Usually, the frequency spectrum 67 of the compensated read signal 430, which is the output of the read compensate circuit 43, also has frequency spectra (671 and 672) outside the Nyquist band. Now, the equalized waveform is distorted by these extra-band frequency components 671 and 672. Against this, the PR(1+D) characteristic filter 441 generates a point where frequency spectrum becomes 0 (hereinafter referred to as the null point) on the higher side 673 of the frequency (point of Nyquist frequency f=0.5$f_b$, where $f_b$ is the bit frequency), and the frequency spectrum is shaped from 671 to 681. Then, the PR(1−D) characteristic added by the equalizer 439 forms the null point in the frequency spectrum of the lower frequency side (point of f=0) 674, and the frequency spectrum is shaped from 672 to 682. A frequency spectrum 78, which the output signal 440 of the equalizer 439 of the CPM system augmented with the PR system has with respect to the compensated read signal 430, can be accommodated in the Nyquist band 601.

This embodiment of the invention can remove distortion due to waveform interference because the frequency f of the waveform equalized by the characteristics of the PR(1+D) filter and the PR(1−D) equalizer exists only within the range of $0 \leq f \leq 0.5 f_b$, which is the Nyquist band, and satisfies Nyquist conditions.

Figure 16:
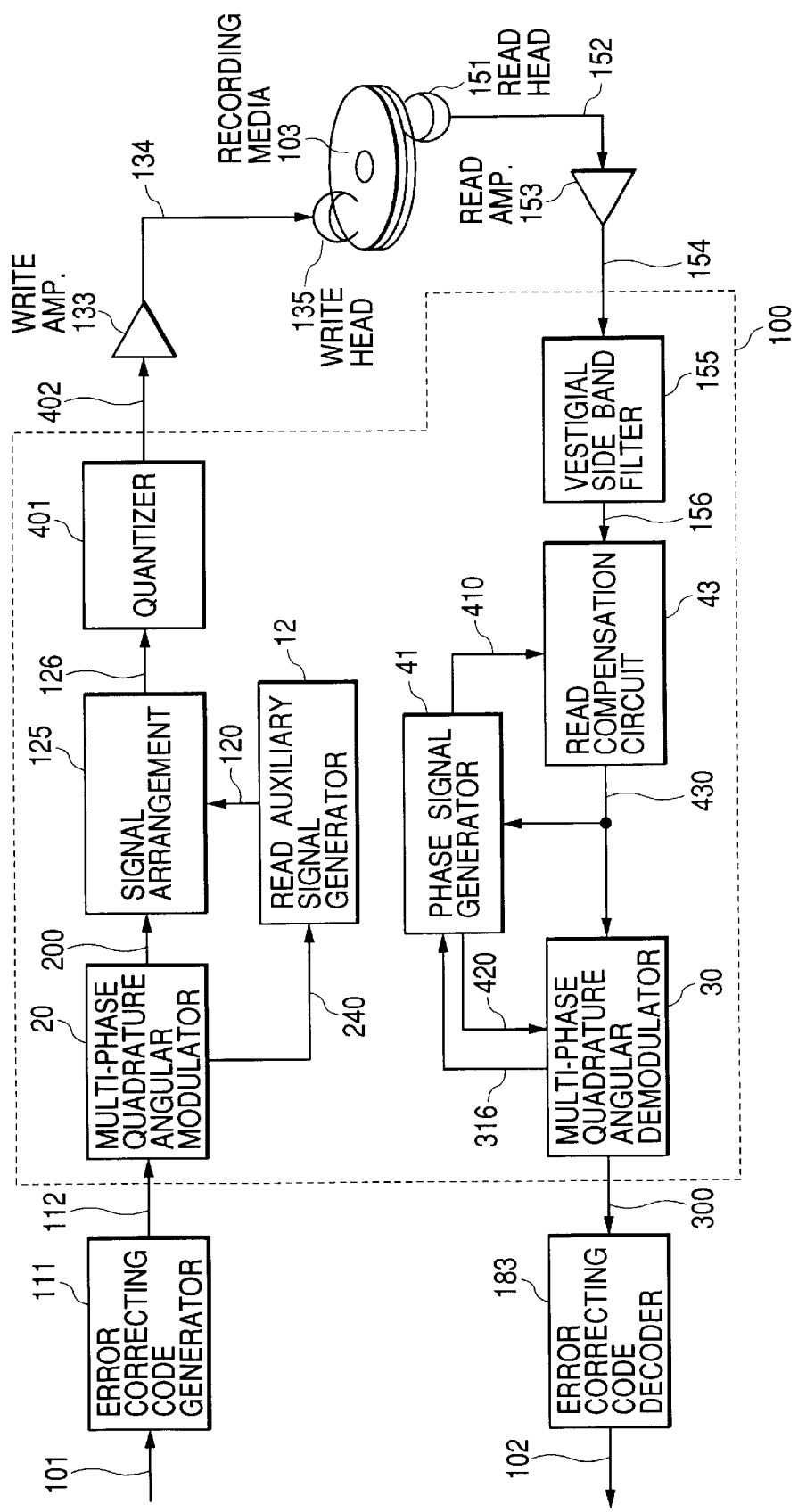
FIG. 16 is a block diagram showing the configuration of recording and reproduction in a magnetic disk apparatus, which is another preferred embodiment of the invention.

Next will be described still another embodiment of the invention with reference to the block diagram of FIG. 16, illustrating the configuration of recording and reproduction in a magnetic disk apparatus. The example shown in FIG. 16 is a variation of the information recording and reproducing apparatus shown in FIG. 1. Although the modulation system is similar to that shown in FIG. 1, the CPM system by which information is expressed in phase difference and frequency difference, the demodulation system is different from its counterpart in FIG. 1. Thus, a VSB filter 155 is added downstream from the read amplifier 153. This VSB filter 155 uniformly shapes the sum of the signal power held by the upper side band and the signal power held by the lower side band in the frequency characteristics of the amplified read signal 154, and supplies a VSB filter output signal 156. The subsequent signal processing is similar to that in FIG. 1.

Figure 17A:
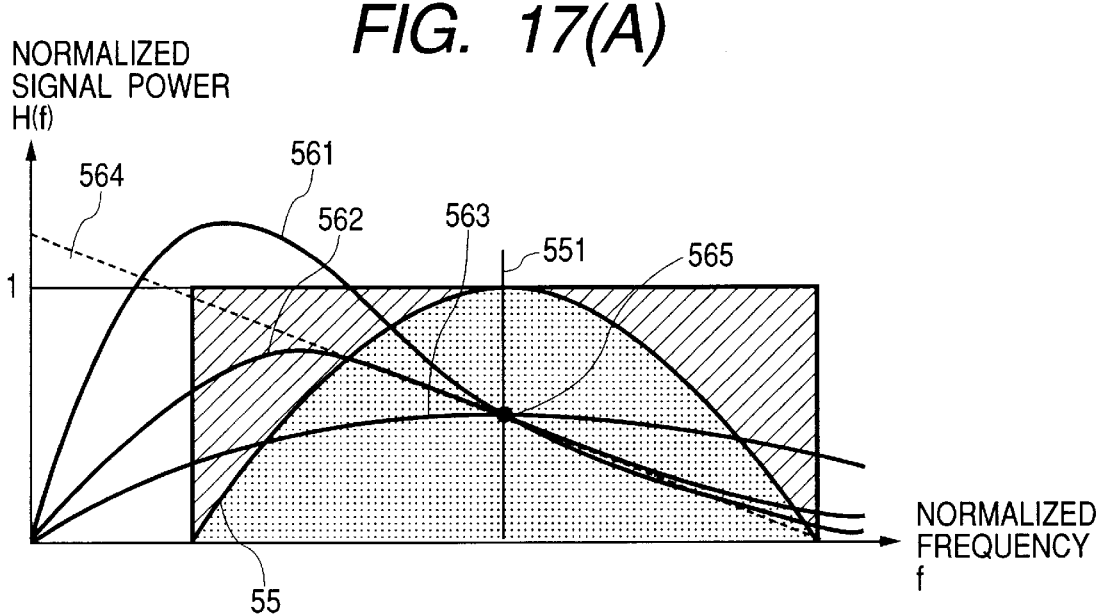
FIG. 17 shows the frequency spectrum of a VSB filter matching the transmission channel characteristics of the embodiment shown in FIG. 16 of the invention.
Figure 17B:
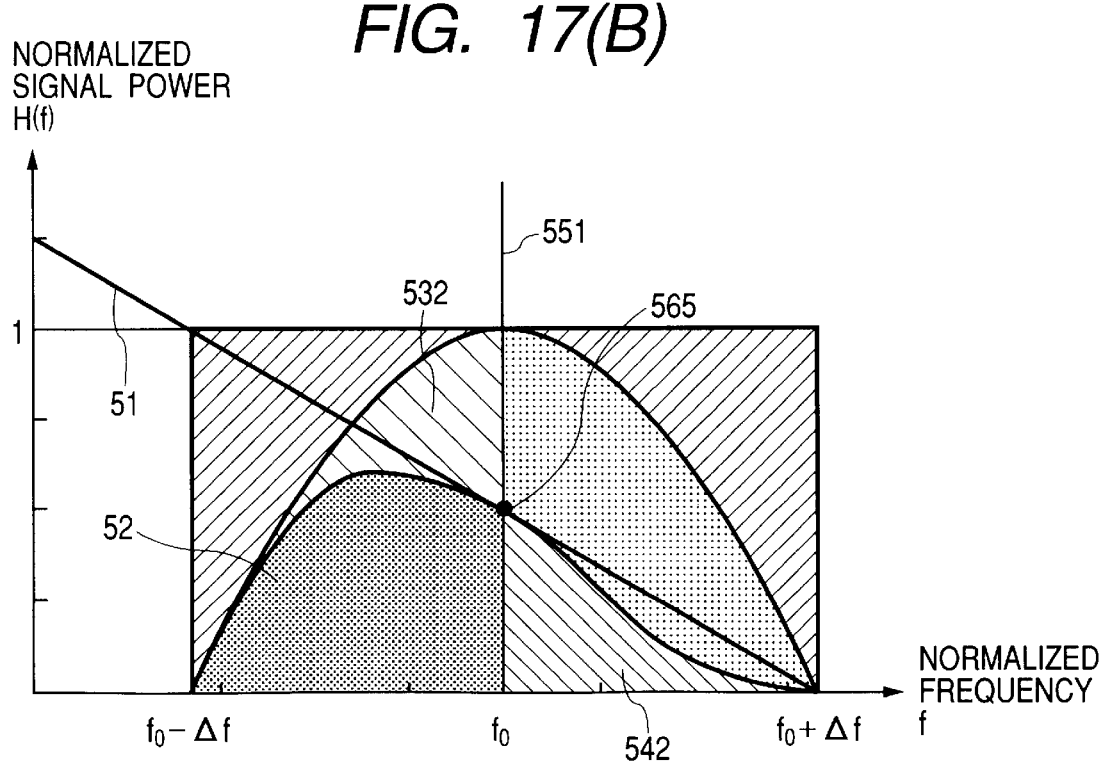

The frequency spectra of a demodulating system using a transmission channel will now be described with reference to frequency spectral diagrams shown in FIG. 17. FIG. 17(A) shows the frequency spectrum of the transmission channel characteristics and FIG. 17(B), the frequency spectrum of the VSB filter matched to the transmission channel characteristics.

The power of the modulated signal is normalized with the level of the modulated signal at the center frequency 551 of a frequency band 55 which the modulated signal has. The transmission channel characteristics are so normalized as to pass the normalized signal power 0.5 (this point will hereinafter be referred to as the center point 565) at the normalized frequency $f_0 = 0.5$. Hereupon, the transmission channel characteristics are denoted by 561 (high density), 562 (medium density) and 563 (low density). The following description will refer to the transmission channel characteristics 562 at the medium density by way of example. As it uses the transmission channel characteristics 562, the transmission channel characteristics constitute an approximately straight line 564 passing the center point 565 in the signal band, the normalized signal power 1 at the lower end of the band and the normalized signal power 0 at the upper end of the band. In the transmission channel characteristics 561 at another level of recording density, especially at a high recording density, the approximate line of the VSB filter characteristics 51 equalizes the attenuation 532 of the VSB filter output characteristics 52 and the residual amount 542 of the upper side band in the lower side band by passing the center point 565, the normalized signal power 1 at the lower end of the band and the normalized signal power 0 at the upper end of the band.

The VSB filter characteristics 51 need to pass the center point 565 and to make constant the sum of the signal power of the upper side band and that of the lower side band in order to obtain VSB characteristics, and also needs to closely resemble the approximately straight line 564 in order to utilize the transmission channel characteristics. For this reason, the VSB filter characteristics 51 are set to have VSB characteristics and to manifest a straight line close to the approximately straight line 564. The VSB filter characteristics 51 become identical with the approximately straight line 564 of the transmission channel characteristics, and demodulation is performed with this transmission channel characteristics being deemed to be the VSB filter. In the case of the other two levels of recording density, demodulation is performed by setting the VSB filter characteristics to match them to some line close to the transmission channel characteristics to be used.

The VSB filter output characteristics 52 and the residual amount 542 of the upper side band have characteristics compensated by the VSB filter because what are attenuated by the transmission channel characteristics are used in the VSB demodulating system under the present patent, application.

This embodiment of the invention can demodulate signals while suppressing the influence of harmonic components by using a demodulation system utilizing the transmission channel characteristics in an information recording and reproducing apparatus having a modulation/demodulation system using a carrier. The use of the demodulation system utilizing the transmission channel characteristics permits recording and reproduction of information even in an apparatus in which high frequency components, i.e. signals in the upper side band, significantly attenuate along with an improvement in recording density.

Figure 18A:
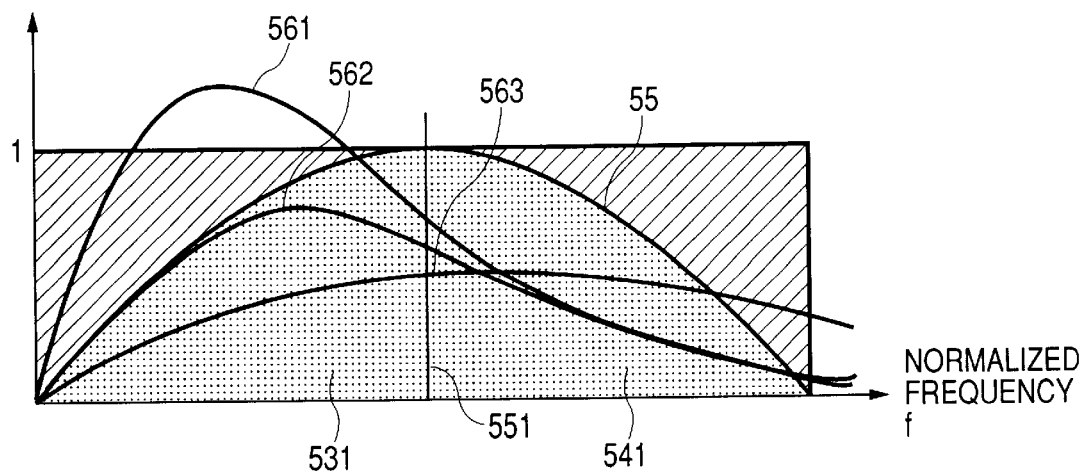
FIG. 18 shows the frequency spectrum of a VSB filter matching the transmission channel characteristics corresponding to an enhancement in recording density in another embodiment of the invention.
Figure 18B:
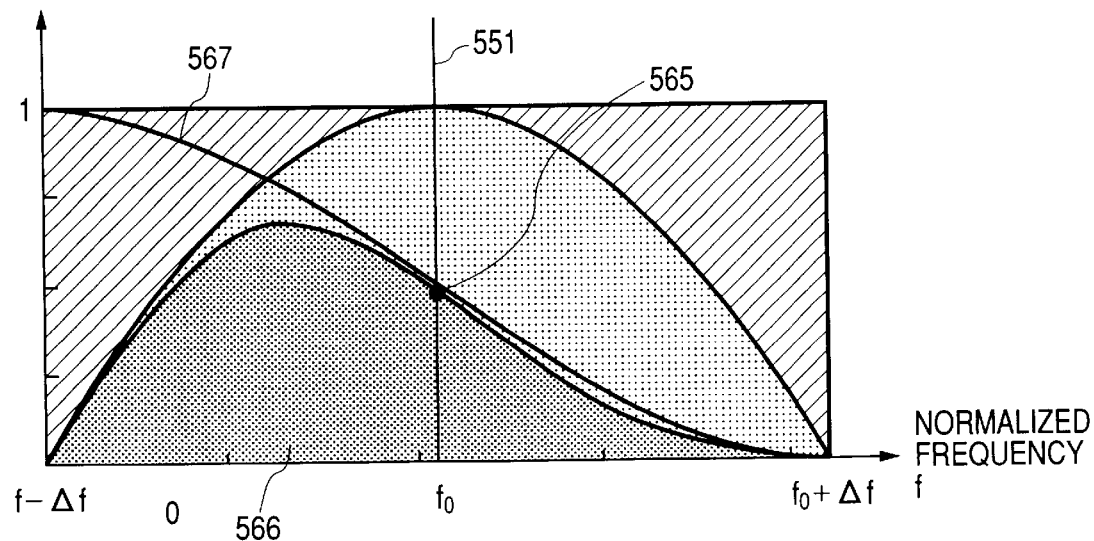

Next will be described another variation with reference to FIG. 18. FIG. 18(A) shows the frequency spectrum of the transmission channel characteristics, and FIG. 18(B), the frequency spectrum of the VSB filter characteristic matched to the recording density.

Referring to FIG. 18, the transmission channel characteristics vary as indicated by 563, 562 and 561 with an increase in recording density. If then it is set as VSB filter characteristics 567, frequency characteristics 566, which are the VSB filter output characteristics of the signal having undergone waveform shaping by the VSB filter closely resembles the transmission channel characteristics 561. When the recording density is enhanced, the maximum level of the transmission channel characteristics transitions toward the lower frequency side. Then, by so varying the characteristics of the VSB filter characteristic 567 as to decrease the attenuation amount on the lower frequency side and to increase that on the higher frequency side, the maximum level of the signal frequency characteristics 566 of the VSB filter output is set on the lower frequency side.

Use of this embodiment makes it possible, in an information recording and reproducing apparatus having a modulation/demodulation system using a carrier, to match the filter characteristics to any signal distortion due to transmission channel characteristics accompanying improvement in recording density and to improve performance even where the recording density is high by using a demodulation system using transmission channel characteristics.

While the transmission channel characteristics are approximated to a straight line in the example described above, where the transmission channel characteristics are different, this arrangement can also be used by using a function close to the transmission channel characteristics as the filter characteristics.

In an information recording and reproducing apparatus having a modulation/demodulation system using a carrier and limited in the frequency band that can pass the transmission channels of the recording/reproduction system, data demodulation is made possible by using a demodulation system having a demodulation characteristic matching the frequency band of the transmission channels.

The use of a demodulation system matching frequency characteristic of the transmission channels can, even in an apparatus in which the attenuation amount of signals in the high frequency band increases with a rise in recording density, reduce its influence on the transmission channels and enhance the recording density. The use of a demodulation system matching the frequency characteristics of the transmission channels serves to prevent noise contained in the band in which signals are feeble from being amplified and thereby prevent the signals from deteriorating because equalization on the demodulation side does not allow the band in which signals are very weak to be amplified.

Whereas a plurality of embodiments of the present invention have been described so far, the invention is not confined to these embodiments, but can be varied in many different ways without deviating from its essentials.

For instance, while the foregoing description of the second embodiment referred to a four-level CPPSK system and that of the fourth embodiment referred to a modulator/demodulator of a four-level CPFSK system, eight-level or 16-level modulation/demodulation system can as well be used, or the CPPSK system and the CPFSK system may be interchanged.

It is further possible to combine different embodiments, and combination can produce mutually reinforcing effects.

Although the foregoing description of the invention referred to a magnetic disk apparatus which can take two levels of amplitude, the invention can as well be applied to four-level or eight-level information recording and reproducing apparatuses, and it can also be used in signal processing circuits, integrated circuits, optical magnetic disk apparatuses, optical disk apparatuses, flexible disk apparatuses and the like for information processing use.

What is claimed is:

1. An information recording and reproducing apparatus comprising:
   a multi-phase quadrature angular modulator for performing multi-phase quadrature continuous angular modulation of a date signal to be written on a medium to generate a modulated signal expressing information in phase difference and frequency difference;
   a quantizer for quantizing an amplitude of the modulated signal with reference to a certain amplitude level;
   a write head for writing the output signal of the quantizer onto the medium;
   a read head for reading information written on the medium;
   a read compensation circuit for compensating the phase and amplitude of a read signal from the read head; and
   a multi-phase quadrature angular demodulator for performing multi-phase quadrature continuous angular demodulation of the read signal from the read compensation circuit.

2. The information recording and reproducing apparatus according to claim 1, wherein said multi-phase quadrature angular modulator is provided with a circuit for performing base-band modulation, a write coding circuit for limiting the band, and said multi-phase quadrature angular demodulator is provided with a write decoding circuit for decoding the signal coded by the write coding.

3. The information recording and reproducing apparatus according to claim 1, further comprising:
   a read auxiliary signal generator for generating a read auxiliary signal on the basis of phase information and amplitude information on the modulated signal,
   wherein the read auxiliary signal and the modulated signal are input into the quantizer, such that the quantizer generates a rectangular waveform signal resulting from quantization of the mixed signal to a certain amplitude level.

4. The information recording and reproducing apparatus according to claim 1, wherein the multi-phase quadrature angular modulator, the quantizer, the read compensation circuit, and the multi-phase quadrature angular demodulator are integrated in a single integrated circuit (IC).

5. An information recording and reproducing apparatus comprising:
   an error correcting cods generator for generating an error correcting code for data to be written on a recording medium;

a frequency transition limited coder for coding to limit the frequency transition of the output signal of the error correcting code generator;

a multi-phase quadrature angular modulator for subjecting the output signal of the frequency transition limited coder to multi-phase quadrature angular modulation to generate a modulated signet expressing information in phase difference and frequency difference;

a quantizer for generating a discrete signal by making discrete the amplitude of the modulated signal generated by the quadrature angular modulator with reference to a certain level;

a write head for waiting the output signal of the quantizer onto the recording medium;

a read head for reading information written on the recording medium;

a read compensation circuit for compensating the phase and amplitude of a signal read out of the read head;

a multi-phase quadrature angular demodulator for subjecting a signal supplied from the read compensation circuit to multi-phase quadrature angular demodulation to generate a demodulated signal;

a frequency transition limited decoder for subjecting the demodulated signal from the multi-phase quadrature angular demodulator to decoding matching said frequency transition limited coder; and an error correcting code decoder for correcting any error in the output signal from the frequency transition limited decoder.

6. A signal processing method comprising the steps of:

performing multi-phase quadrature continuous angular modulation of a data signal to be written on a recording medium to generate a modulated signal expressing information in phase difference and frequency difference;

generating a discrete signal resulting from quantization of an amplitude of the waveform of the modulated signal with reference to a certain amplitude level;

recording, on the recording medium, the discrete signal expressing information in the timing variation of said amplitude;

reproducing, from the recording medium, a read signal indicating information read from the recording medium; and performing multi-phase quadrature continuous angular demodulation of the read signal to generate a demodulated signal in a manner matching the multi-phase quadrature continuous angular modulation.

7. The signal processing method according to claim 6, wherein the amplitude of the waveform of the modulated signal takes on a discrete level, and information is written on the recording medium in a multi-level signal made discrete in the phasic direction.

8. The signal processing method according to claim 7, wherein said continuous angular demodulation is accomplished with a signal resulting from the attenuation of the higher-than-the-center side of the frequency band of the read signal.

9. The signal processing method according to claim 6, wherein said multi-phase quadrature continuous angular modulation supplies the data signal to be written in a form in which the current waveform is inverted, and the current waveform is generated even if zero "0" emerges consecutively in the data signal.

10. The signal processing method according to claim 6, wherein said modulated signal is in a form in which the current waveform is inverted according to the information to be written on the recording medium, and wherein an inversion period of the current waveform differs from then write bit period of information.

11. A modulating apparatus comprising:

a carrier generator for generating a first carrier signal expressed in a cosine waveform and a second carrier signal expressed in a sine waveform;

a base-band pulse signal generator for generating consecutive base-band pulse signals;

a base-band modulator for generating a first base-band modulated signal expressed in a cosine waveform and a second base-band modulated signal expressed in a sine waveform by convoluting information and the base-band pulse signals for conversion into a phase difference;

a first multiplier for multiplying the first base-band modulated signal and the first carrier signal;

a second multiplier for multiplying the second base-band signal and the second carrier signal; and a first adder for synthesizing the output of the first multiplier and the output of the second multiplier.

12. The modulating apparatus, according to claim 11, wherein said base-band pulse signal generator generates a signal resulting from integration of consecutive base-band signals.

13. The modulating apparatus according to claim 11, wherein said carrier generator generates a carrier having a frequency higher than the center of the frequency band of the signal.

14. A signal modulating method comprising the steps of:

generating a modulated signal by subjecting information to multi-phase quadrature continuous angular modulation;

generating a cosine wave signal used in said modulation, generating a read auxiliary signal on the basis of the cosine wave signal;

preparing a mixed signal by arranging the modulated signal and the read auxiliary signal in a sequence matching a prescribed format; and generating a rectangular waveform signal resulting from quantization of an amplitude of the mixed signal to a certain amplitude level.

15. A signal modulating method comprising the steps of:

generating, from data, a first carrier signal expressed in a cosine waveform and a second carrier signal expressed in a sine waveform;

generating consecutive base-band pulse signals according to a modulating system;

generating a first base-band modulated signal expressed in a cosine waveform and a second base-band modulated signal expressed in a sine waveform by convoluting said data and said base-band pulse signals for conversion into a phase difference;

generating a cosine modulated signal by multiplying the first base-band modulated signal and the first carrier signal;

generating a sine modulated signal by multiplying the second base-band signal and the second carrier signal; and generating a modulated signal by adding the cosine modulated signal and the sine modulated signal.

16. A demodulating apparatus comprising:

a carrier restoring circuit for generating a carrier and a phase from a real component read signal read out of a recording medium;

a first multiplier for multiplying the real component carrier generated from the carrier restoring circuit;

an imaginary component generator for generating an imaginary component read signal from the real component signal;

an adder for adding the imaginary component read signal and the real component read signal;

a phase delay circuit for generating an imaginary component carrier by delaying by 90° the phase of the real component carrier generated from the carrier restoring circuit; and a second multiplier for multiplying the imaginary component carrier generated by the phase delay circuit and the imaginary component read signal generated from the imaginary component generator by each other, wherein a signal recorded on the recording medium is demodulated by using the carrier having both real and imaginary components generated from the first or second multiplier.

17. The demodulating apparatus, according to claim 16, further comprising:

an equalizer for equalizing the signal read out of the recording medium to a signal whose band has been limited to a rectangular wave matching the write current used when the signal was written onto the recording medium; and a demodulator for performing demodulation matching the characteristic of the band-limited signal.

18. A demodulating apparatus, comprising:

a carrier restoring circuit for generating a carrier and a phase from a real component read signal read out of a recording medium;

a first multiplier for multiplying the real component carrier generated from the carrier restoring circuit;

an imaginary component generator for generating an imaginary component read signal from the real component signal;

an adder for adding the imaginary component read signal and the real component read signal;

a phase delay circuit for generating an imaginary component carrier by delaying by 90° the phase of the real component carrier generated from the carrier restoring circuit; and a second multiplier for multiplying the imaginary component carrier generated from the phase delay circuit and the imaginary component read signal generated by said imaginary component generator by each other, wherein a signal recorded on the recording medium is demodulated by using the carrier having both real and imaginary components generated from the first or second multiplier, and wherein said carrier restoring circuit is provided with: means for generating a carrier having an odd multiple, greater than a multiple by "1", of the frequency of the carrier; and means for removing a carrier by using the carrier having a frequency of said odd multiple, so that the frequency spectrum of the base-band signal is at least a multiple of the modulated waveform by an even integer.

19. An information recording and reproducing apparatus comprising:

a quadrature angular modulator for performing continuous angular modulation of information to be written to be expressed in phase difference and frequency difference;

a quantizer for generating a signal whose amplitude of a modulated waveform obtained from the quadrature angular modulator is made discrete;

a write head for recording a signal expressing information on a medium at the varying timing of said amplitude;

a read head for reproducing, from the medium, a read signal indicating information read from the medium; and a demodulator for performing continuous angular demodulation of the read signal by attenuating the higher-than-the-center side of its frequency band.

20. The information recording and reproducing apparatus according to claim 19, wherein said demodulator performs said continuous angular demodulation by using a signal resulting from the attenuation of the higher-than-the-center side of the frequency band of the read signal and a signal resulting from the attenuation of the lower frequency side.

* * * * *